United States Patent
Dewa et al.

(10) Patent No.: US 10,841,636 B2
(45) Date of Patent: *Nov. 17, 2020

(54) INFORMATION PROCESSING APPARATUS, MOBILE TERMINAL, INFORMATION PROCESSING METHOD, PROGRAM, AND INFORMATION PROCESSING SYSTEM

(71) Applicant: Saturn Licensing LLC, New York, NY (US)

(72) Inventors: Yoshiharu Dewa, Tokyo (JP); Naohisa Kitazato, Tokyo (JP); Naoyuki Sato, Tokyo (JP); Tetsuo Yutani, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,624

(22) Filed: Oct. 26, 2017

(65) Prior Publication Data
US 2018/0124448 A1 May 3, 2018

Related U.S. Application Data

(63) Continuation of application No. 14/430,523, filed as application No. PCT/JP2013/075446 on Sep. 20, 2013, now Pat. No. 9,843,830.

(30) Foreign Application Priority Data

Sep. 28, 2012 (JP) ................................ 2012-218759

(51) Int. Cl.
*H04N 7/18* (2006.01)
*H04N 21/414* (2011.01)
(Continued)

(52) U.S. Cl.
CPC ..... *H04N 21/41407* (2013.01); *H04N 21/236* (2013.01); *H04N 21/23614* (2013.01);
(Continued)

(58) Field of Classification Search
CPC ........... H04N 21/41407; H04N 21/236; H04N 21/23614; H04N 21/2665; H04N 21/431;
(Continued)

(56) References Cited

U.S. PATENT DOCUMENTS

| 6,018,768 A | 1/2000 | Ullman |
| 8,312,497 B2 | 11/2012 | Pearson |

(Continued)

FOREIGN PATENT DOCUMENTS

| CN | 1497877 A | 5/2004 |
| CN | 101853273 A | 10/2010 |

(Continued)

OTHER PUBLICATIONS

International Preliminary Report on Patentability and Written Opinion of the International Searching Authority issued in International Application No. PCT/JP2013/075446, dated Mar. 31, 2015 (with English translation).

(Continued)

*Primary Examiner* — John R Schnurr
(74) *Attorney, Agent, or Firm* — Oblon, McClelland, Maier & Neustadt, L.L.P.

(57) ABSTRACT

The present technology relates to an information processing apparatus, mobile terminal, information processing method, program, and information processing system that can make it possible to easily link information output by a certain device to information output by another device.
An information processing apparatus according to one aspect of the present technology includes: a reception control unit for allowing receiving a content containing first
(Continued)

address information specifying a source of provision of first information being information related to the content; an output control unit for allowing outputting the content; an acquisition unit for acquiring the first information from a server acting as the source of the provision of the first information based on the first address information; and a provision unit for providing, to a mobile terminal, second address information included in the first information, the second address information specifying a source of provision of second information being mobile terminal-specific information related to the content. The present technology can be applied to a device including a display.

20 Claims, 29 Drawing Sheets

(51) Int. Cl.
| | |
|---|---|
| *H04N 21/236* | (2011.01) |
| *H04N 21/431* | (2011.01) |
| *H04N 21/434* | (2011.01) |
| *H04N 21/462* | (2011.01) |
| *H04N 21/81* | (2011.01) |
| *H04N 21/436* | (2011.01) |
| *H04N 21/658* | (2011.01) |
| *H04N 21/2665* | (2011.01) |
| *H04N 21/435* | (2011.01) |
| *H04N 21/443* | (2011.01) |
| *H04N 21/64* | (2011.01) |
| *H04N 21/858* | (2011.01) |
| *H04N 21/41* | (2011.01) |

(52) U.S. Cl.
CPC ....... *H04N 21/2665* (2013.01); *H04N 21/431* (2013.01); *H04N 21/436* (2013.01); *H04N 21/4345* (2013.01); *H04N 21/4355* (2013.01); *H04N 21/4431* (2013.01); *H04N 21/4622* (2013.01); *H04N 21/64* (2013.01); *H04N 21/6581* (2013.01); *H04N 21/8133* (2013.01); *H04N 21/8173* (2013.01); *H04N 21/8586* (2013.01); *H04N 21/4122* (2013.01); *H04N 21/4126* (2013.01); *H04N 21/43615* (2013.01)

(58) Field of Classification Search
CPC ........... H04N 21/4345; H04N 21/4355; H04N 21/436; H04N 21/4431; H04N 21/4622; H04N 21/64; H04N 21/6581; H04N 21/8133; H04N 21/8173; H04N 21/8586; H04N 21/4122; H04N 21/4126; H04N 21/43615

See application file for complete search history.

(56) References Cited

U.S. PATENT DOCUMENTS

| | | | |
|---|---|---|---|
| 8,763,060 B2* | 6/2014 | Jerremy | H04N 21/4126 725/110 |
| 8,856,853 B2* | 10/2014 | Casagrande | H04N 21/44008 725/100 |
| 2002/0162121 A1 | 10/2002 | Mitchell | |
| 2003/0131361 A1 | 7/2003 | Yamamoto et al. | |
| 2007/0089158 A1 | 4/2007 | Clark | |
| 2008/0030747 A1 | 2/2008 | Shingai | |
| 2008/0307476 A1* | 12/2008 | Choi | H04H 60/12 725/109 |
| 2009/0144793 A1 | 6/2009 | Lin | |
| 2010/0222102 A1 | 9/2010 | Rodriguez | |
| 2011/0016746 A1 | 1/2011 | Callahan et al. | |
| 2011/0167468 A1 | 7/2011 | Lee | |
| 2011/0321107 A1 | 12/2011 | Banks | |
| 2012/0011550 A1 | 1/2012 | Holland | |
| 2012/0134297 A1 | 5/2012 | Sakamoto | |
| 2012/0174170 A1 | 7/2012 | Dewa et al. | |
| 2012/0210349 A1 | 8/2012 | Campana | |
| 2013/0015213 A1 | 1/2013 | Perignon et al. | |
| 2013/0152135 A1 | 6/2013 | Hong | |
| 2013/0160046 A1* | 6/2013 | Panje | H04N 21/4126 725/32 |

FOREIGN PATENT DOCUMENTS

| | | |
|---|---|---|
| EP | 2343881 A2 | 7/2011 |
| EP | 2482550 A2 | 5/2012 |
| JP | 2003-271502 A | 9/2003 |
| JP | 2005-033371 A | 2/2005 |
| JP | 2006-166284 A | 6/2006 |
| JP | 2010-239360 A | 10/2010 |
| JP | 2010-257355 A | 11/2010 |
| JP | 2011-160119 A | 8/2011 |
| JP | 2012-113659 A | 6/2012 |
| JP | 2012-517188 A | 7/2012 |
| WO | 2002/017639 A2 | 2/2002 |
| WO | 2010/068035 A2 | 6/2010 |
| WO | WO 2011/037401 A2 | 3/2011 |

OTHER PUBLICATIONS

Extended European Search Report issued in European Application No. 13840625.1, dated Sep. 21, 2016.
Brazilian Office Action dated Jan. 14, 2020 in Brazilian Patent Application No. BR112015006322-5 (with English translation), citing documents AA through AC and AO therein, 6 pages.

* cited by examiner

FIG. 13

```
navigator.receiverDevice.launchHTMLdocumentOnExternal(title, URL);
```
↑ 201

```
http://www.AAA.com/TV/index.html?tv-ipaddress=http://192.168.0.3/command/
```
　　　URL FOR MOBILE TERMINAL DISPLAY　　　URL FOR TV DATA TRANSMISSION/RECEPTION
↑ 202

FIG. 15

```
navigator.receiverDevice.sendTextToExternalDevice("data");
```
↖ 211

```
navigator.receiverDevice.receiveTextFromExternalDevice("data");
```
↖ 212

INFORMATION PROCESSING APPARATUS, MOBILE TERMINAL, INFORMATION PROCESSING METHOD, PROGRAM, AND INFORMATION PROCESSING SYSTEM

CROSS REFERENCE TO PRIOR APPLICATIONS

This application is a continuation of U.S. application Ser. No. 14/430,523, filed Mar. 23, 2015, which is a National Stage of PCT/JP2013/075446, filed Sep. 20, 2013 and claims the benefit of priority under 35 U.S.C. § 119 of Japanese Application No. 2012-218759, filed Sep. 28, 2012. The entire contents of which are incorporated herein by reference.

TECHNICAL FIELD

The present technology relates to an information processing apparatus, a mobile terminal, an information processing method, a program, and an information processing system, and particularly relates to an information processing apparatus, mobile terminal, information processing method, program, and information processing system that is made to be capable of easily linking information output by a certain device to information output by another device.

BACKGROUND ART

In recent years, TV link with what is called a second screen device has been focused with the spread of mobile terminals such as smartphones and tablet terminals. In TV link with the second screen device, a TV is set as a device including a first screen, and a mobile terminal to be a device including a second screen is caused to display a Web page with a content linked to a program shown on TV.

As a technology for achieving TV link, there is a technology for allowing an application installed in a mobile terminal to recognize the sound of a content output from a TV, access a server on the Web with the recognition result as a key, and display information.

CITATION LIST

Patent Document

Patent Document 1: JP 2005-333371 A

SUMMARY OF THE INVENTION

Problems to be Solved by the Invention

If sound recognition is required on the mobile terminal side to perform TV link with the second screen device, the accuracy of sound recognition needs to be ensured.

The present technology has been made considering such a circumstance, and enables an easy link between information output by a certain device and information output by another device.

Solutions to Problems

An information processing apparatus according to a first aspect of the present technology includes: a reception control unit for allowing receiving a content containing first address information specifying a source of provision of first information being information related to the content; an output control unit for allowing outputting the content; an acquisition unit for acquiring the first information from a server acting as the source of the provision of the first information based on the first address information; and a provision unit for providing, to a mobile terminal, second address information included in the first information, the second address information specifying a source of provision of second information being mobile terminal-specific information related to the content.

The first information is an HTML document including the description of a script. The provision unit realized by executing the script can be configured to provide the second address information by use of an API of a Web browser.

The provision unit can be configured to provide the second address information to which a URL containing an IP address assigned to the information processing apparatus has been added.

A communication unit for communicating with the mobile terminal after the mobile terminal acquires the second information based on the second address information can be further provided.

The first information is an HTML document including the description of a script. The communication unit realized by executing the script can be configured to transmit data to the mobile terminal and receive data transmitted from the mobile terminal with the URL containing the IP address as a transmission destination, by use of the API of the Web browser.

The reception control unit can be configured to receive the broadcast content.

An analysis unit for analyzing an application information table included in a broadcast signal of the content can be further provided. In this case, the acquisition unit can be configured to acquire the first information based on the first address information obtained by analyzing the application information table.

The output control unit can be configured to display a video of the content, and display information related to the content based on the first information The first information and the second information can be configured to be information prepared on a content basis by an operator who provides the content.

An information processing apparatus according to a second aspect of the present technology includes: an address information acquisition unit for acquiring second address information provided from an information processing apparatus that receives a content containing first address information specifying a source of provision of first information being information related to the content, outputs the content, acquires the first information from a server acting as the source of the provision of the first information based on the first address information, and provides the second address information included in the first information, the second address information specifying a source of provision of second information being mobile terminal-specific information related to the content; a related information acquisition unit for acquiring the second information from a server acting as the source of the provision of the second information based on the second address information; and an output control unit for allowing outputting information related to the content based on the second information.

The address information acquisition unit can be configured to acquire the second address information to which a URL containing an IP address assigned to the information processing apparatus has been added.

A communication unit for communicating with the information processing apparatus after the second information is acquired can be further provided.

The second information is an HTML document including the description of a script. The communication unit realized by executing the script can be configured to transmit transmission target data to the information processing apparatus by an HTTP request to which the transmission target data has been added, the HTTP request including the URL containing the IP address as a transmission destination, and receive data transmitted by the information processing apparatus by an HTTP request requesting the reception of the data.

An information processing system according to a third aspect of the present technology includes: an information processing apparatus having a reception control unit for allowing receiving a content containing first address information specifying a source of provision of first information being information related to the content, an output control unit for allowing outputting the content, an acquisition unit for acquiring the first information from a server acting as the source of the provision of the first information based on the first address information, and a provision unit for providing, to a mobile terminal, second address information included in the first information, the second address information specifying a source of provision of second information being mobile terminal-specific information related to the content; and a mobile terminal having an address information acquisition unit for acquiring the second address information provided from the information processing apparatus, a related information acquisition unit for acquiring the second information from a server acting as the source of the provision of the second information based on the second address information, and an output control unit for allowing outputting information related to the content based on the second information.

In the present technology, a content is received which includes first address information that specifies a source of provision of first information being information related to the content. The content is output. The first information is acquired from a server acting as the source of the provision of the first information based on the first address information. Second address information, included in the first information, that specifies a source of provision of second information being mobile terminal-specific information related to the content is provided to the mobile terminal. Moreover, the provided second address information is acquired. The second information is acquired from a server acting as the source of the provision of the second information based on the second address information. Information related to the content is output based on the second information.

Communication naturally includes wireless and wired communication, and may be one in which wireless communication and wired communication are mixed, in other words, communication in which wireless communication is performed in a certain section, and wired communication is performed in another section. Furthermore, communication from a certain apparatus to another apparatus may be performed in a wired manner, communication from the other device to the certain apparatus may be performed in a wireless manner.

Effects of the Invention

According to the present technology, it is possible to easily link information output by a certain device to information output by another device.

BRIEF DESCRIPTION OF DRAWINGS

FIG. 13 is a diagram illustrating an example of a Web app start function.

FIG. 15 is a diagram illustrating an example of an API of a Web browser of the TV.

MODE FOR CARRYING OUT THE INVENTION

<Configuration Example of Information Processing System>

Figure 1:
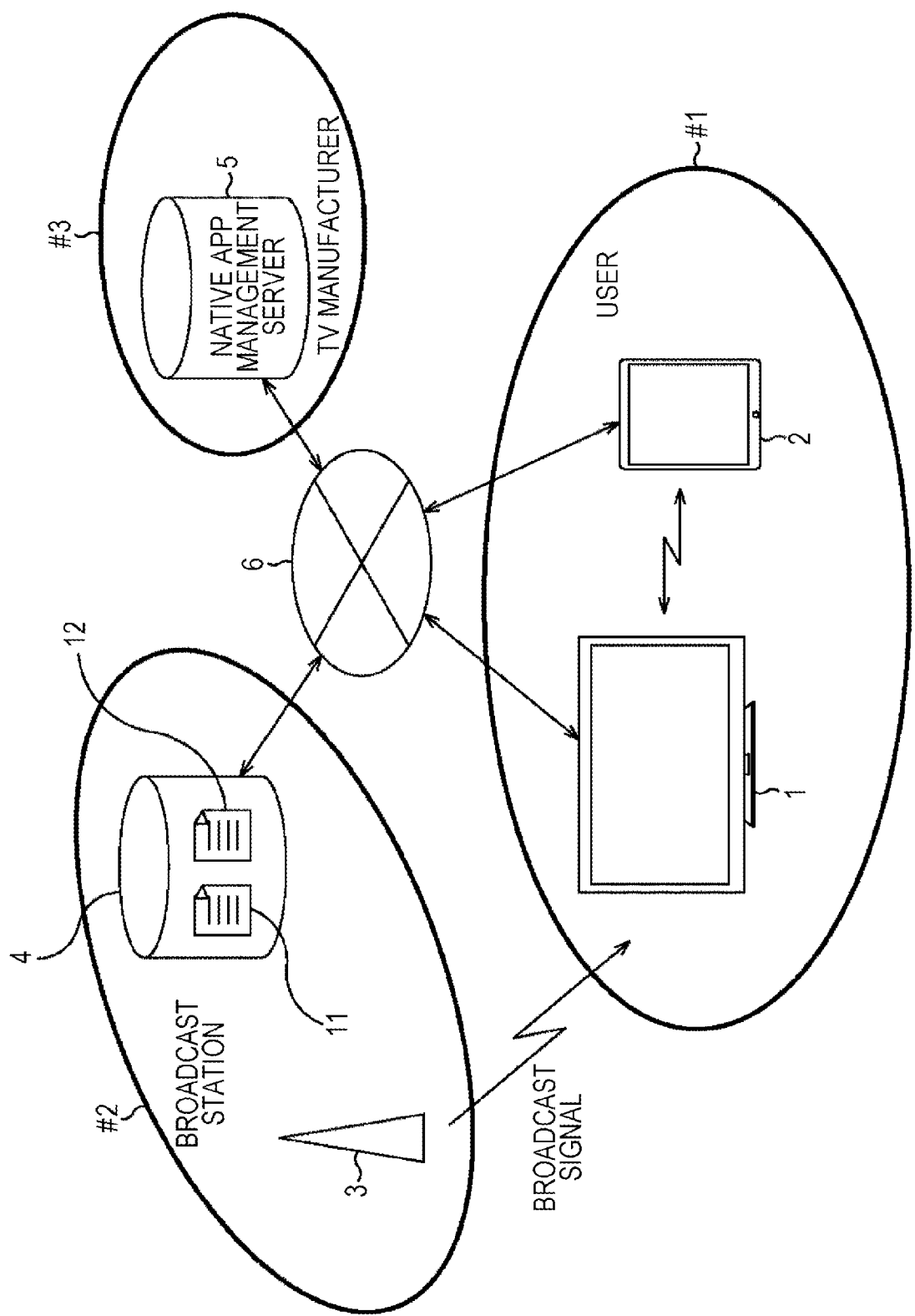
FIG. 1 is a diagram illustrating a configuration example of an information processing system according to one embodiment of the present technology.

FIG. 1 is a diagram illustrating a configuration example of an information processing system according to one embodiment of the present technology.

The information processing system of FIG. 1 is composed of a TV 1, a mobile terminal 2, a broadcast station 3, a Web app management server 4, and a native app management server 5. The TV 1, the mobile terminal 2, the Web app management server 4, and the native app management server 5 are connected to the Internet 6.

As illustrated encircled by an ellipse #1, the TV 1 and the mobile terminal 2 are devices used by a user. The TV 1 receives a broadcast signal from the broadcast station 3, and outputs the video and audio of a program. The mobile terminal 2 is a mobile type terminal including a display, such as a smartphone, a tablet terminal, or a game machine. If the TV 1 is assumed to be a device having a first screen, the mobile terminal 2 is a device having a second screen, which is used by the user.

The mobile terminal 2 is a device installed with a predetermined OS (Operating System) such as Android (trademark), iOS (trademark), or Windows (registered trademark) RT, and executes various applications developed for the OS installed in the mobile terminal 2. The TV 1 and the mobile terminal 2 not only communicate with a server on the Internet 6, respectively, but also communicate with each other via a home network built by a wireless LAN (Local Area Network) or the like.

As illustrated encircled by an ellipse #2, the broadcast station 3 and the Web app management server 4 are managed by a broadcaster. A TV-specific HTML (Hyper Text Markup Language) document 11 and a mobile-specific HTML document 12, which have been prepared by the broadcaster for a certain program to be broadcast by the broadcast station 3, are stored in the Web app management server 4.

The TV-specific HTML document 11 is an HTML document for the TV 1 acquired by a Web browser installed in the TV 1 and used for screen display and the like. The mobile-specific HTML document 12 is an HTML document for the mobile terminal 2 acquired by a WebView installed in the mobile terminal 2 and used for screen display and the like. The TV-specific HTML document 11 and the mobile-specific HTML document 12 contain, for example, information related to the same program being on the air. The WebView has the function of processing an HTML file and displaying a Web page and the like as in the Web browser.

The TV-specific HTML document 11 and the mobile-specific HTML document 12 contain not only the description of an HTML but also the description of a script such as JavaScript (registered trademark). The TV-specific HTML document 11 is a Web app (Web application) to be executed on the Web browser. The mobile-specific HTML document 12 is a Web app to be executed on the WebView. In the following description, starting the HTML document indicates starting the Web app. Executing the HTML document indicates executing the Web app.

For example, the TV-specific HTML document 11 and the mobile-specific HTML document 12 perform the process of displaying a Web page, a process using an API (Application Programming Interface) of the Web browser, and the like, based on descriptions included in the HTML documents.

The native app management server 5 illustrated as being encircled by an ellipse #3 is, for example, a server managed by a manufacturer of the TV 1. The native app management server 5 manages what is called a native application that operates on the OS installed in the mobile terminal 2.

The application managed by the native app management server 5 is downloaded to and installed in the mobile terminal 2 at the request of the mobile terminal 2. The application management by the native app management server 5 is installed in the mobile terminal 2. Accordingly, a function for displaying information such as a Web page related to a program that the TV 1 is receiving is added to the mobile terminal 2.

The application downloaded from the native app management server 5 and installed in the mobile terminal 2 is hereinafter referred to as the TV companion app, as appropriate.

In the information processing system having such a configuration, the TV-specific HTML document 11 and the mobile-specific HTML document 12, which have been prepared by the broadcaster as information related to the certain program, are used to achieve TV link with the second screen device.

Figure 2:
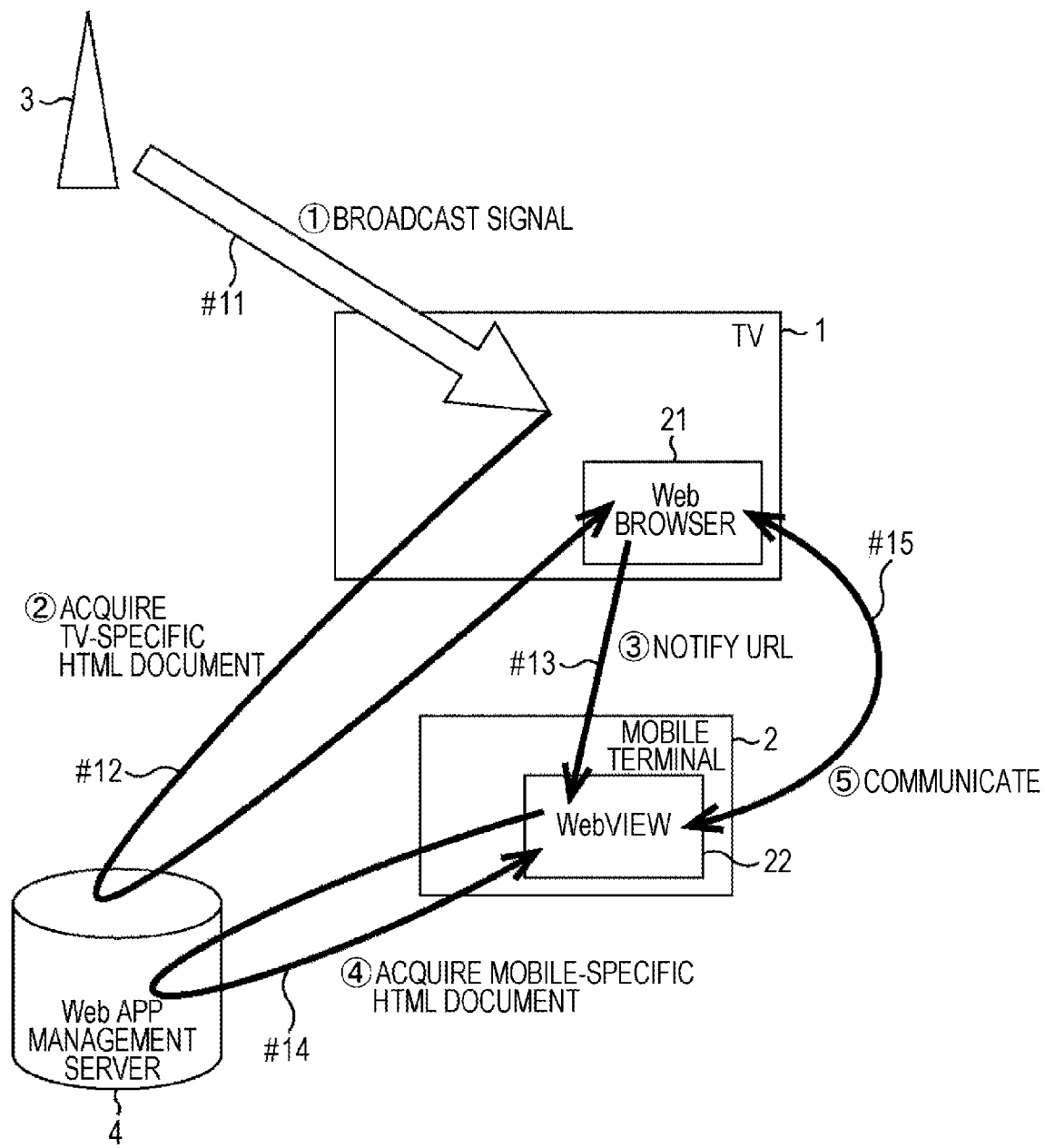
FIG. 2 is a diagram illustrating the flow until the establishment of TV link.

FIG. 2 is a diagram illustrating the flow until the establishment of TV link. The detailed flow is described later. It is assumed here that the TV companion app has already been installed in the mobile terminal 2.

The TV 1 receives a broadcast signal from the broadcast station 3 as pointed by an arrow #11. The broadcast signal contains an AIT (Application Information Table). The AIT is information including data that transmits additional application information for identifying and controlling an application, and is transmitted in predetermined time intervals.

As indicated by an arrow #12, a Web browser 21 of the TV 1 accesses the Web app management server 4 based on an URL (Uniform Resource Locator) specified by the AIT, and acquires the TV-specific HTML document 11. The URL specified by the AIT indicates an address on the Web app management server 4 acting as a source of provision of the TV-specific HTML document 11.

The TV-specific HTML document 11 is acquired and processed by the Web browser 21. Accordingly, a Web page related to the program that is being received is displayed on the TV 1. Moreover, it enters into a state where the Web app has been executed on the TV 1. Various processes are performed by the TV-specific HTML document 11. The TV-specific HTML document 11 contains an URL indicating an address on the Web app management server 4 acting as a source of provision of the mobile-specific HTML document 12.

In this manner, the broadcast signal from the broadcast station 3 does not contain the URL indicating the address on the Web app management server 4 of the mobile-specific HTML document 12, which is information for the mobile terminal 2.

As indicated by an arrow #13, the TV-specific HTML document 11 being executed on the Web browser 21 notifies the TV companion app being executed in the mobile terminal 2 of the URL of the mobile-specific HTML document 12.

As indicated by an arrow #14, a WebView 22 included in the TV companion app accesses the Web app management server 4 based on the URL notified by the TV 1, and acquires the mobile-specific HTML document 12.

The TV companion app including the WebView 22 processes the mobile-specific HTML document 12. Accordingly, a Web page related to the program that is being received by the TV 1 is displayed on a display of the mobile terminal 2. Moreover, it enters into a state where the Web app has been executed on the mobile terminal 2. Various processes are performed by the mobile-specific HTML document 12.

After the HTML documents have been executed in both the TV 1 and the mobile terminal 2, communication is performed between the TV-specific HTML document 11 and the mobile-specific HTML document 12 as indicated by an arrow #15. The communication between the HTML documents is used. Accordingly, information displayed on the mobile terminal 2, such as a Web page and VOD, is switched in conjunction with the progress of the program.

From the above processing, TV link for displaying, on the mobile terminal 2, a Web page related to the program that is being received by the TV 1 is achieved.

Figure 3:
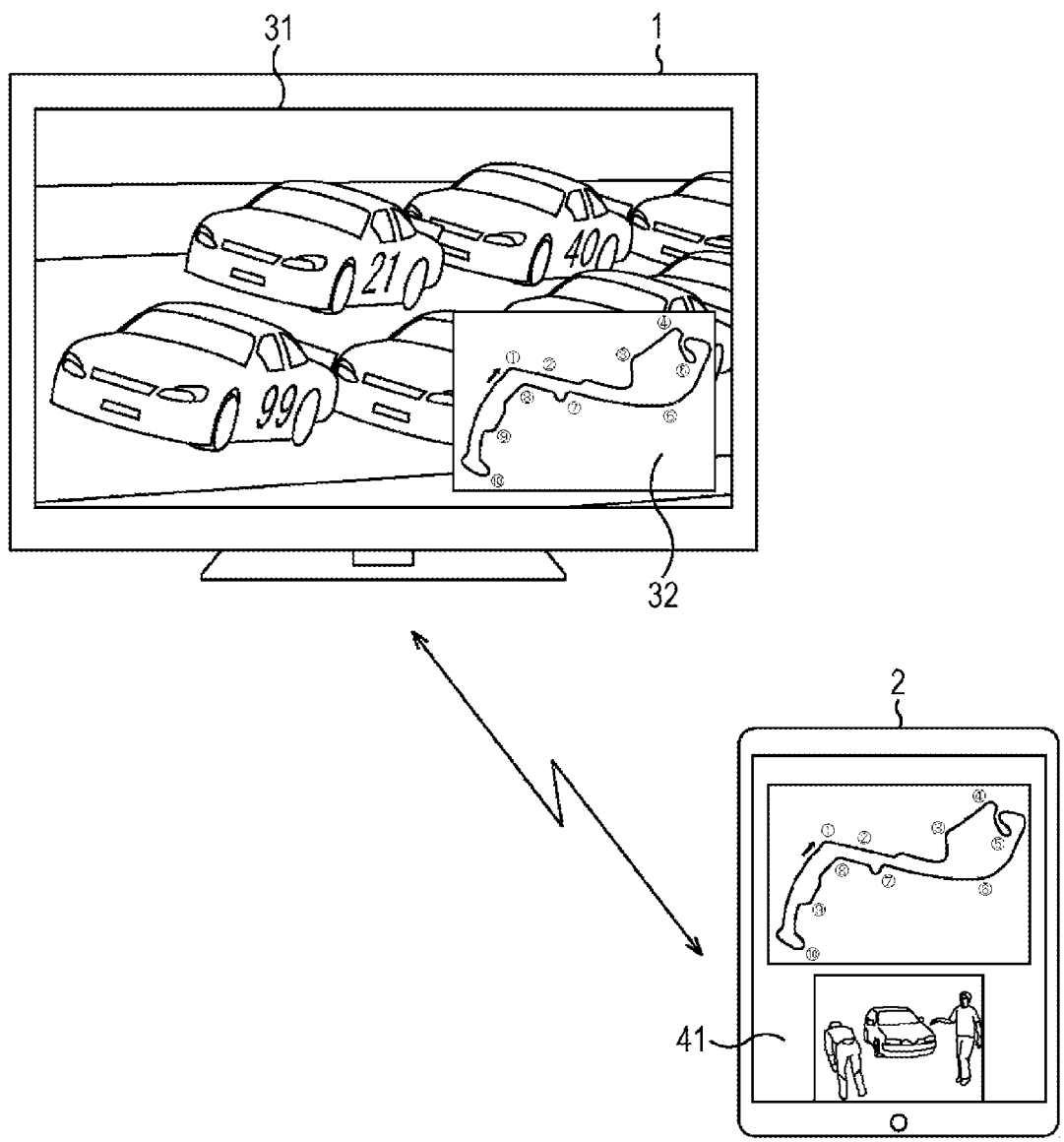
FIG. 3 is a diagram illustrating examples of screen display of a TV and a mobile terminal.

FIG. 3 is a diagram illustrating examples of screen display of the TV 1 and the mobile terminal 2.

The video of a car racing program that is a program being on the air is being displayed on a display 31 of the TV 1. Moreover, a Web information display area 32 is formed in the bottom right of the display 31, where information on a race situation is being displayed by the Web browser 21. The information being displayed in the Web information display area 32 is displayed based on the TV-specific HTML document 11.

On the other hand, the information on the race situation is being displayed on a display 41 of the mobile terminal 2 by the TV companion app including the WebView 22. The information being displayed on the display 41 is displayed based on the mobile-specific HTML document 12.

Figure 4:
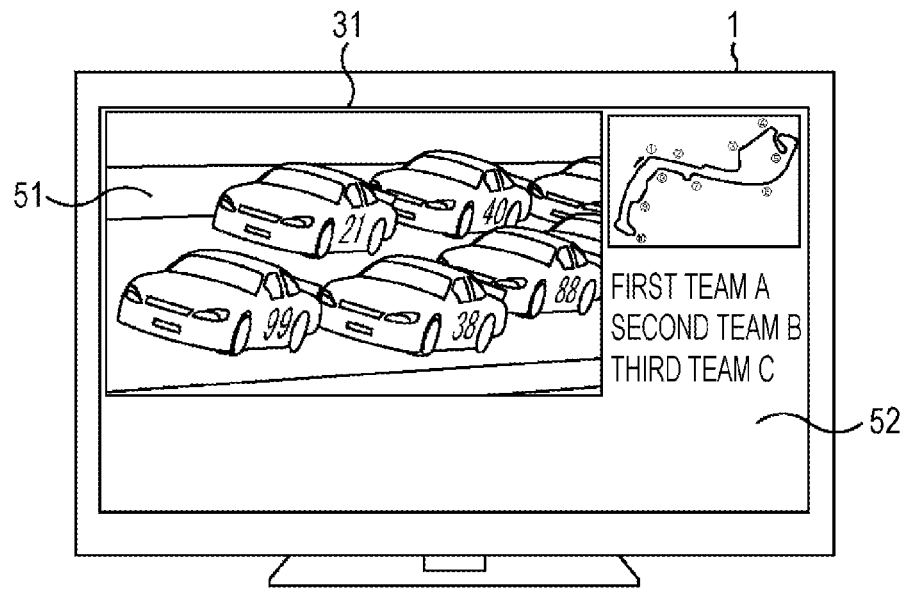
FIG. 4 is a diagram illustrating another example of the screen display of the TV.
Figure 5:
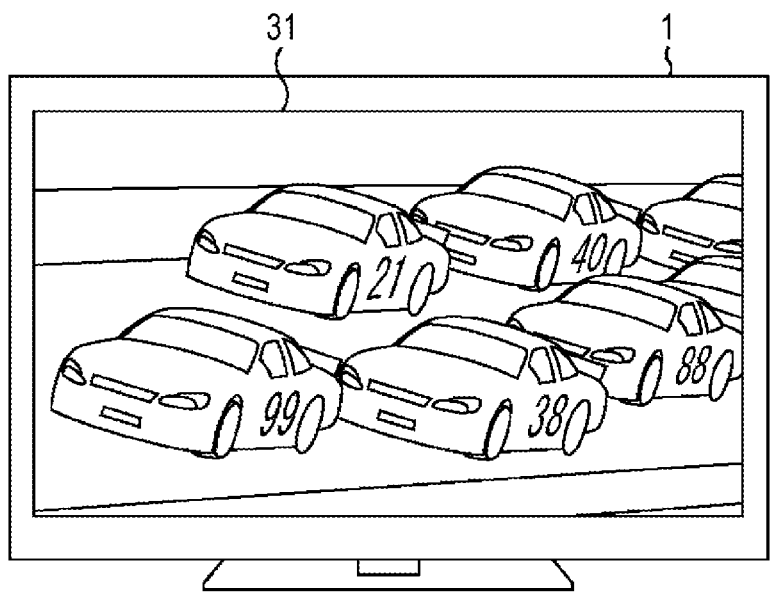
FIG. 5 is a diagram illustrating still another example of the screen display of the TV.

FIGS. 4 and 5 are diagrams illustrating other examples of the screen display of the TV 1.

As illustrated in FIG. 4, the video of the program may be displayed in a program display area 51 formed in the top left of the display 31, and the information related to the program may be displayed in a Web information display area 52 formed in the right and bottom of the display 31, based on the TV-specific HTML document 11.

Moreover, as illustrated in FIG. 5, only the video of the program may be displayed on the TV 1, and the information related to the program may be displayed only on the mobile terminal 2. Also in the state of FIG. 5, the TV-specific HTML document 11 is being executed behind the display of the video of the program.

In this manner, in the information processing system of FIG. 1, a Web app on the TV linked to a broadcast can cause the second screen device such as a smartphone or tablet terminal to display any Web page desired by the Web app. Here, the Web app on the TV has been created under the responsibility of the broadcaster, and the Web page displayed on the second screen device is intended by the broadcaster.

Sound recognition and the like are not required on the second screen device side. Therefore, TV link can be easily achieved.

Moreover, after a first Web page is displayed on the second screen device, it becomes possible to exchange any data between the Web app on the TV and a Web app on the second screen device.

Furthermore, the function that the Web browser (WebView) of the second screen device normally has is used. Therefore, the above things can be achieved in a manner that is independent of the type of device on the second screen device side. In other words, TV link can be achieved irrespective of the OS of the second screen device.

<Example of UI of Mobile Terminal 2>

Figure 6:
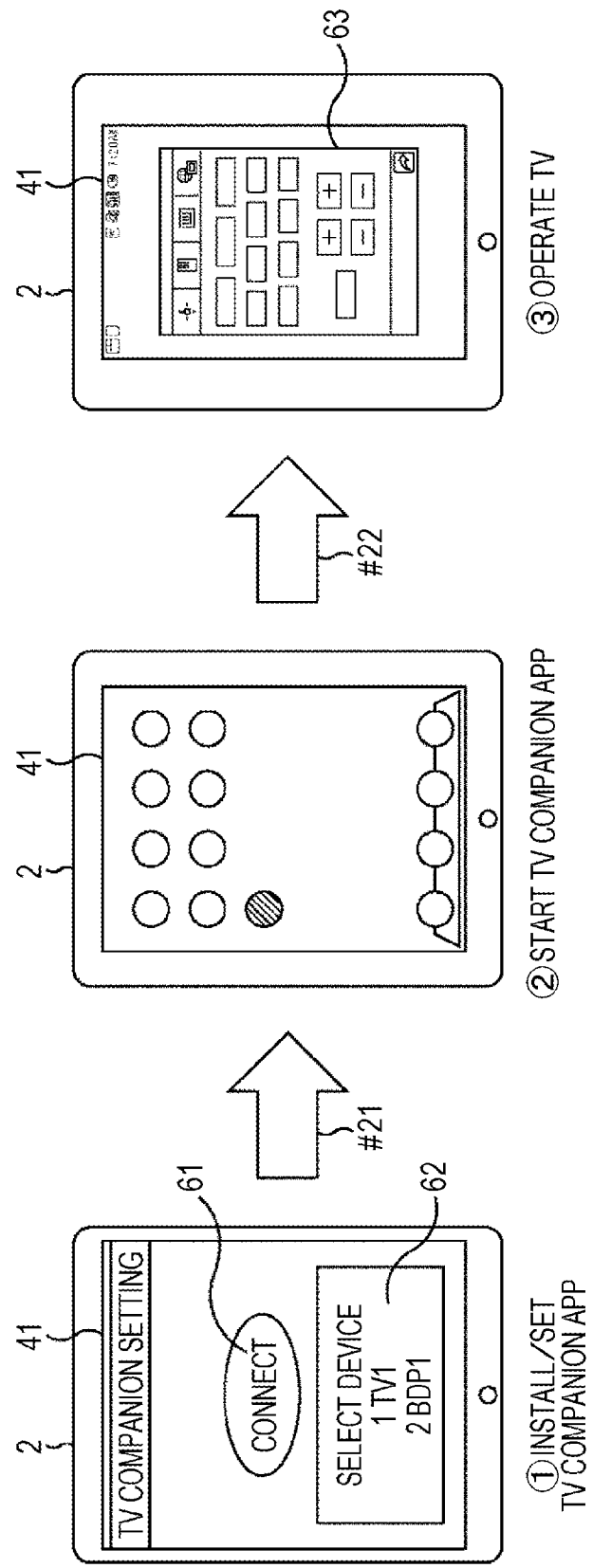
FIG. 6 is a diagram illustrating an example of the transition of the screen display of the mobile terminal.
Figure 7:
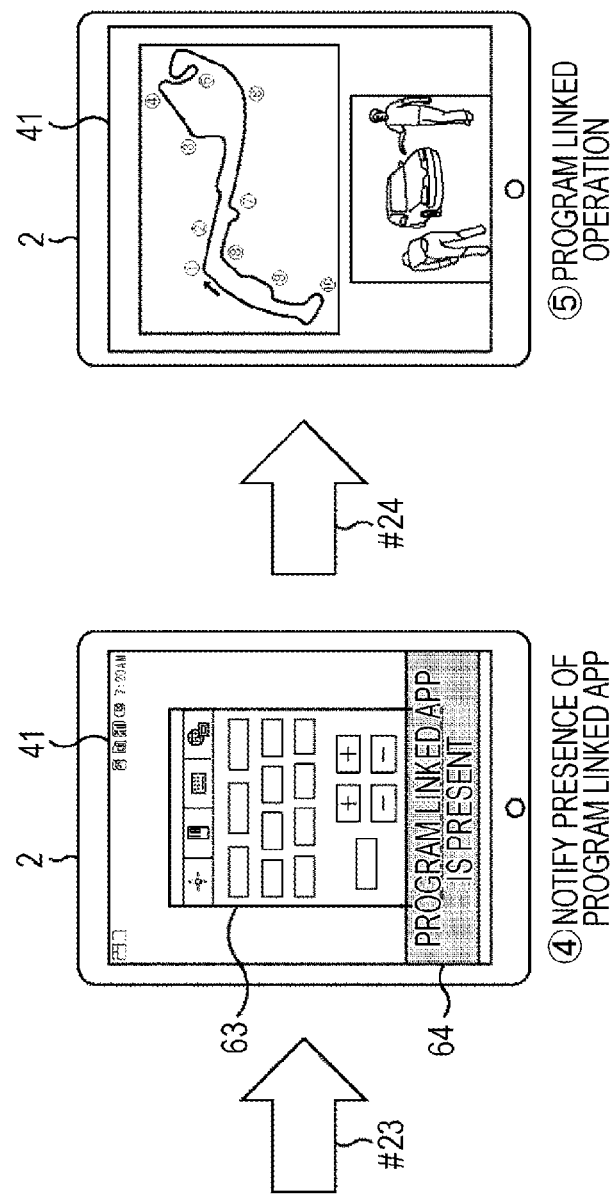
FIG. 7 is a diagram illustrating an example of the transition subsequent to FIG. 6 of the screen display of the mobile terminal.

FIGS. 6 and 7 are diagrams illustrating examples of screen displays of the mobile terminal 2 until TV link starts.

A left screen of FIG. 6 is a setting screen after the TV companion app has been installed. For example, an initial setting is performed after the installation of the TV companion app. When the user selects a device connection function from a menu screen of the TV companion app, connectable devices are searched for, and the TV 1 is detected which is in the same network as the mobile terminal 2.

In the setting screen in the left of FIG. 6, two device names including the TV 1 are being displayed on a list 62 of connectable devices. The TV 1 is selected from the list 62. When a connection button 61 displayed above the list 62 is pressed, information such as an IP address of the TV 1 is saved in the mobile terminal 2.

A screen pointed by an arrow #21 is a menu screen of the OS after the initial setting of the TV companion app. Icons of various applications already installed are being displayed on the menu screen of the OS, which include an icon of the TV companion app.

When the icon of the TV companion app is selected as illustrated with oblique lines, the TV companion app starts. As pointed by an arrow #22, a remote controller image 63 is displayed as a GUI (Graphical User Interface) for operating the TV 1, which is a registered device, on the mobile terminal 2. The remote controller image 63 includes various buttons such as buttons to be operated when switching channels and buttons to be operated when adjusting the volume.

For example, when the user presses a button of a predetermined channel, a control signal is transmitted from the mobile terminal 2 to the TV 1 via the network. In the TV 1, a broadcast signal of the channel specified by the user starts being received. The video and audio of the program are output. The user uses the TV companion app of the mobile terminal 2 to operate the TV 1 and can view the program.

As described above, in the TV 1, while the broadcast signal is being received, the AIT included in the broadcast signal is analyzed. The TV-specific HTML document 11 acquired from the Web app management server 4 is executed on the Web browser 21. Moreover, the Web browser 21 of the TV 1 gives a notification that the mobile-specific HTML document 12 as a program linked app is present, to the TV companion app of the mobile terminal 2.

When the notification that the program linked app is present is received, a message 64 that notifies the user of the presence of the program linked app is displayed by the TV companion app as pointed by an arrow #23 of FIG. 7. The notification is given by the TV companion app even if the user is using another application. The TV companion app operates in the back ground even if the user is using another application, and receives the notification from the Web browser 21 of the TV 1.

When the user instructs the start of the program linked app by, for example, touching the message 64, the URL of the mobile-specific HTML document 12 is acquired from the TV 1 by the TV companion app. Moreover, the mobile-specific HTML document 12 is acquired from the Web app management server 4. As pointed by an arrow #24, the information related to the program is displayed based on the mobile-specific HTML document 12.

<Example of Application Structure>

Figure 8:
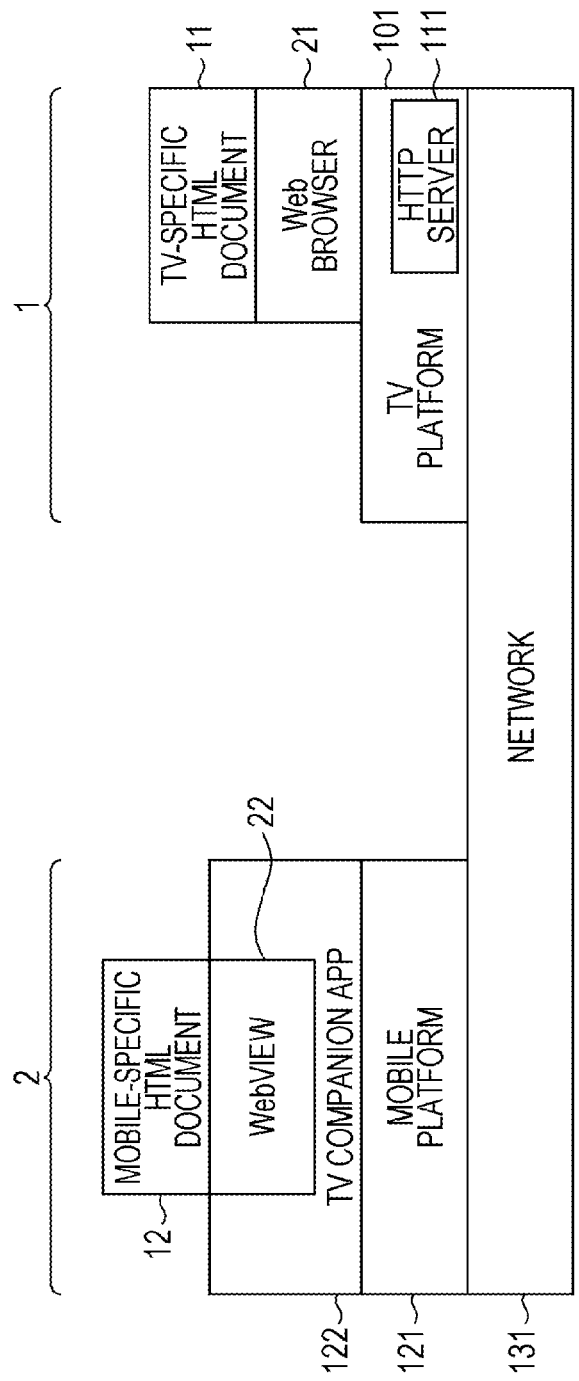
FIG. 8 is a diagram illustrating an example of an application structure.

FIG. 8 is a diagram illustrating an example of an application structure of the TV 1 and the mobile terminal 2.

In the TV 1, a predetermined program is executed. Accordingly, a TV platform 101 is constructed. The Web browser 21 operates on the TV platform 101. The TV platform 101 has the function of an HTTP server 111. Moreover, when the TV-specific HTML document 11 has been acquired from the Web app management server 4, the TV-specific HTML document 11 is executed on the Web browser 21.

On the other hand, in the mobile terminal 2, a mobile platform 121 is constructed by the OS. The WebView 22 and a TV companion app 122 operate on the mobile platform 121. The TV companion app 122 operates including the WebView 22. Moreover, when the mobile-specific HTML document 12 has been acquired from the Web app management server 4, the mobile-specific HTML document 12 is executed on the WebView 22.

The TV platform 101 and the mobile platform 121 are located above a network 131 constructed at home by a wireless LAN or the like, and communicate with each other. An application in the upper layer uses a function held by an application in the lower layer through an API, as appropriate.

Figure 9:
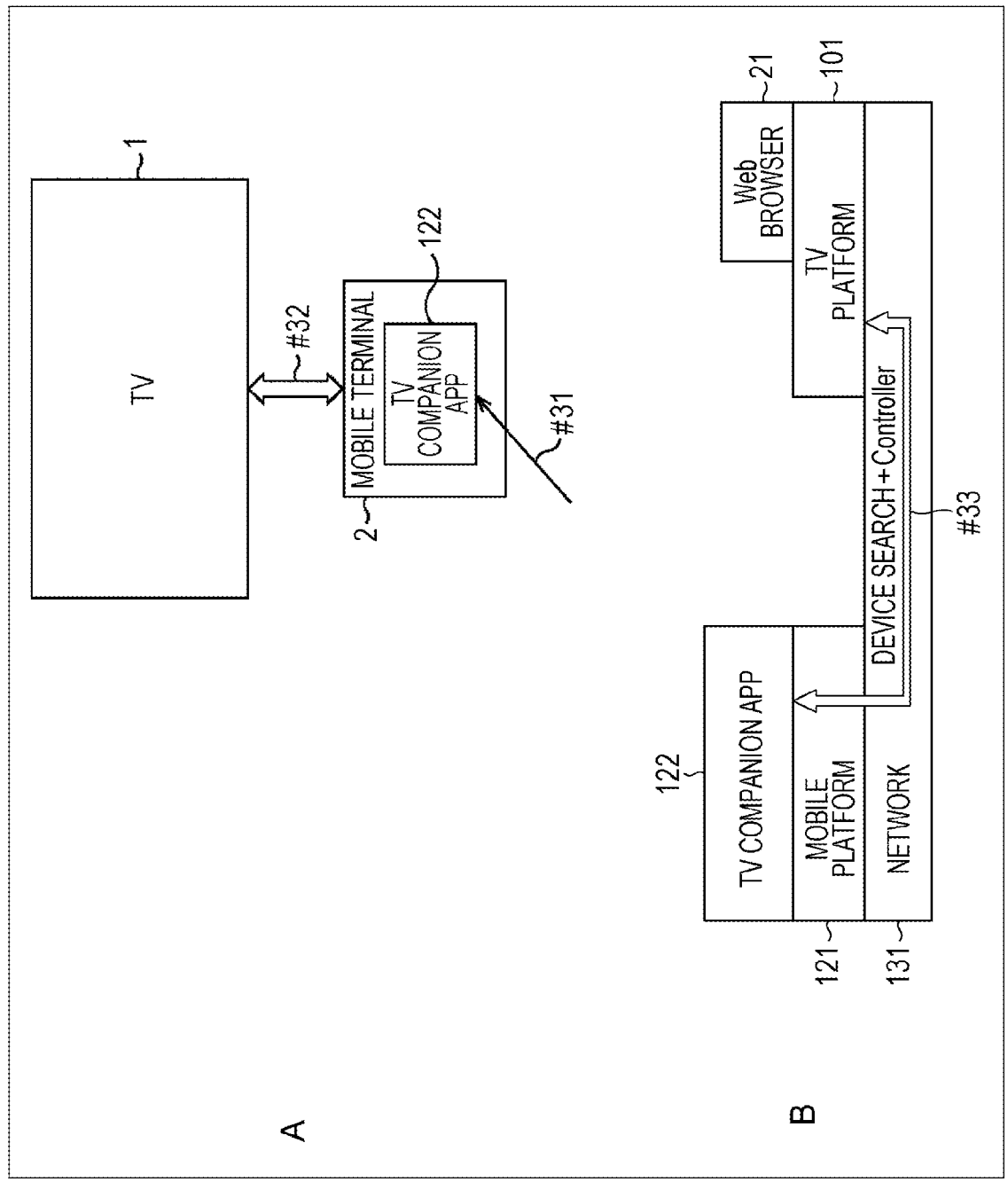
FIG. 9 is a diagram illustrating an exchange between applications before the acquisition of HTML documents.

FIG. 9 is a diagram illustrating an exchange between applications before the acquisition of the HTML documents.

In an example of A of FIG. 9, as indicated by an arrow #31, the TV companion app 122 has been installed in the mobile terminal 2, and is running. The TV 1 and the mobile terminal 2 are connected to a router or the like at home. As indicated by an arrow #32, the TV platform 101 and the mobile platform 121 are in the state of being able to communicate therebetween.

In this case, as illustrated in B of FIG. 9, the TV 1 enters into a state where the Web browser 21 operates on the TV platform 101. Moreover, the mobile terminal 2 enters into a state where the TV companion app 122 operates on the mobile platform 121.

As described with reference to FIG. 6, when the user selects the device connection function, the TV companion app 122 searches for connectable devices. As indicated by an arrow #33 of B of FIG. 9, the TV platform 101 responds to the search by the TV companion app 122. Information such as an IP address is exchanged between the TV companion app 122 and the TV platform 101. Even if the user is using another application, the TV companion app operates in the back ground and performs a search for connectable devices and their status management.

Afterward, a remote UI (User Interface) being a TV function included in the TV platform 101 is provided to the TV companion app 122 based on a communication specification specified by the manufacturer of the TV 1, and the like. The TV function is the function of receiving a broadcast signal and outputting the video and audio of a program. The remote controller image 63 of FIG. 6 corresponds to the remote UI. The TV companion app 122 is prepared by the manufacturer of the TV 1. Therefore, a communication specification unique to the manufacturer can be used for communication between the TV companion app 122 and the TV platform 101.

When the user performs an operation using the remote UI, a control signal is transmitted from the TV companion app 122 to the TV platform 101 via a link indicated by the arrow #33. Various processes related to the TV function are performed by the TV 1.

Figure 10:
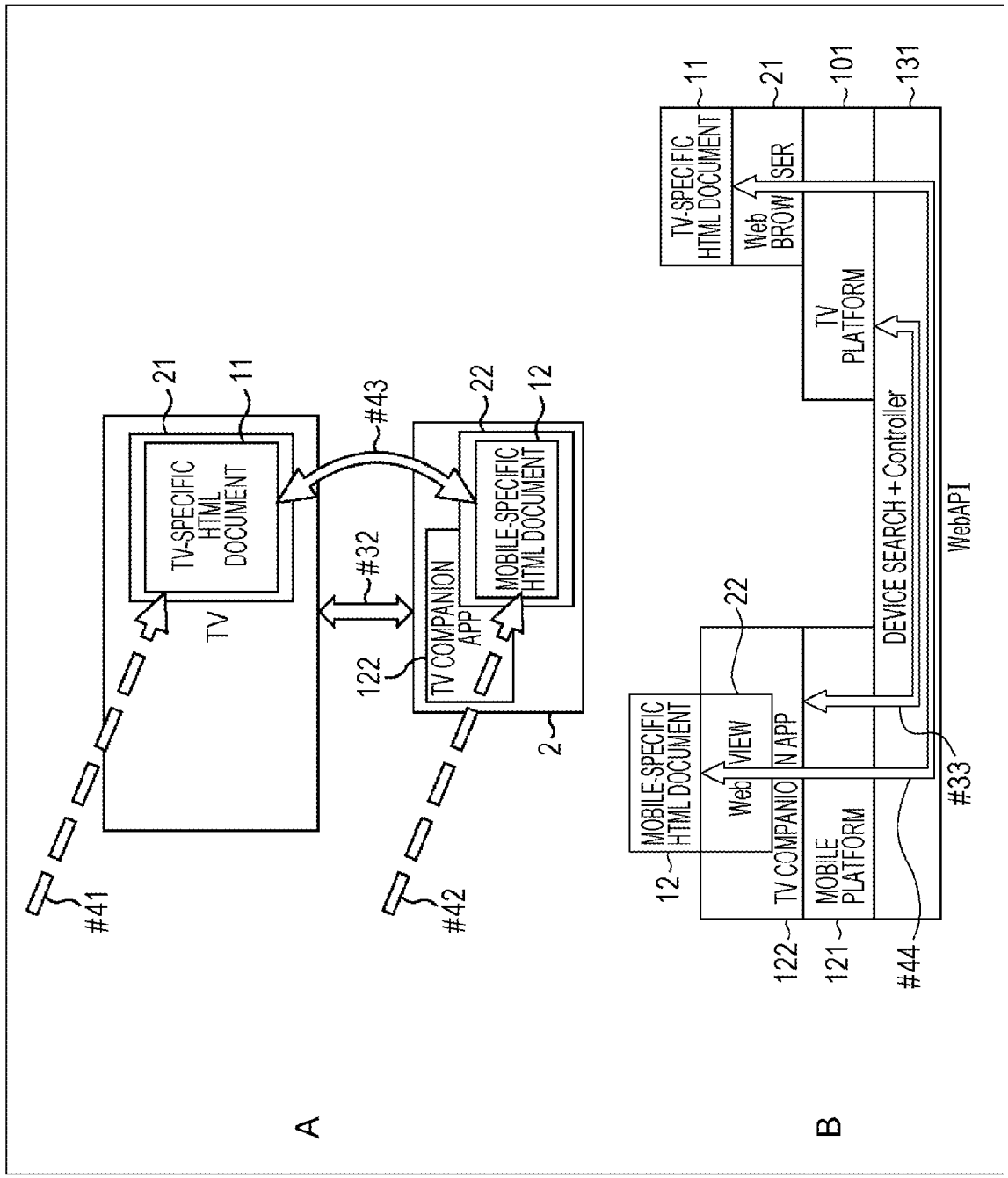
FIG. 10 is a diagram illustrating an exchange between applications after the acquisition of the HTML documents.

FIG. 10 is a diagram illustrating an exchange between applications after the acquisition of the HTML documents.

In an example of A of FIG. 10, the TV-specific HTML document 11 is acquired by the TV 1 as indicated by a broken line arrow #41, and is being executed on the Web browser 21. Moreover, the mobile-specific HTML document 12 is acquired by the mobile terminal 2 as indicated by a broken line arrow #42, and is being executed on the WebView 22.

In this case, as illustrated in B of FIG. 10, the TV 1 enters into a state where the Web browser 21 operates on the TV platform 101, and the TV-specific HTML document 11 is being executed on the Web browser 21. Moreover, the mobile terminal 2 enters into a state where the WebView 22 and the TV companion app 122 operate on the mobile platform 121, and the mobile-specific HTML document 12 is being executed on the WebView 22. The information related to the program is displayed on the display 31 of the TV 1 based on the TV-specific HTML document 11. The information related to the program is displayed on the display 41 of the mobile terminal 2 based on the mobile-specific HTML document 12.

Afterward, as indicated by an arrow #44 of B of FIG. 10, communication is made between the TV-specific HTML document 11 and the mobile-specific HTML document 12 using a WebAPI. Display in conjunction with the program is achieved. The WebAPI is an API that executes a process and receives the result over the network using an HTTP. Moreover, the WebAPI is implemented in the HTTP server 111 of FIG. 8, and is communicated with the TV-specific HTML document 11 via the HTTP server 111.

<Series of Processes of TV Link>

[Process Before Start of Communication Between HTML Documents]

Here, the processes of the TV 1 and the mobile terminal 2 are described with reference to flowcharts.

Figure 11:
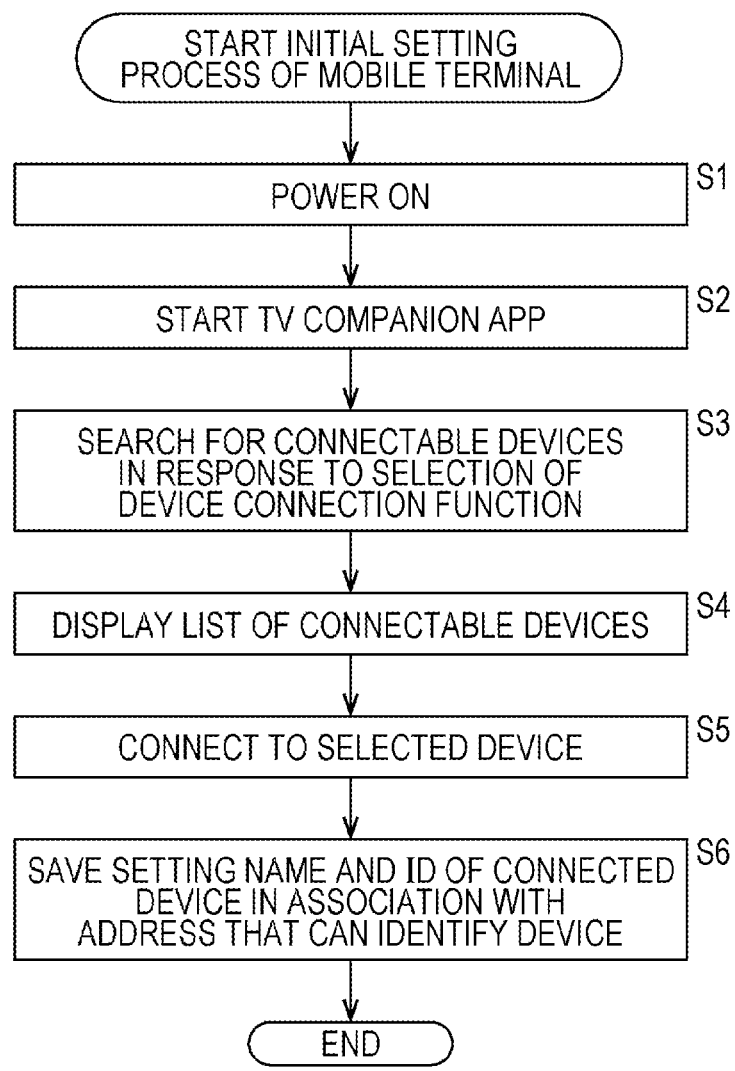
FIG. 11 is a flowchart illustrating an initial setting process of the mobile terminal.

Firstly, an initial setting process of the mobile terminal 2 is described with reference to a flowchart of FIG. 11. The TV companion app 122 is assumed to have been installed in the mobile terminal 2.

In Step S1, the mobile platform 121 is started in response to the turning on of power. When the mobile platform 121 has been started, the menu screen of the OS is displayed on the display 41.

In Step S2, the mobile platform 121 starts the TV companion app 122 in response to the selection of its icon from the menu screen. When the TV companion app 122 has been started, the menu screen of the TV companion app 122 is displayed on the display 41. A button to be operated when the device connection function is selected is provided to the menu screen of the TV companion app 122.

In Step S3, the TV companion app 122 searches for connectable devices in response to the selection of the device connection function by the user. For example, the TV companion app 122 broadcasts a device registration acceptance request over the network 131 being a network to which the mobile terminal 2 is connected. If there is a device that can respond on the network 131, the device notifies its setting name and IP address as a response to the request. Here, the setting name and IP address of the TV 1 are notified by the TV 1.

In Step S4, the TV companion app 122 displays a list of connectable devices including the TV 1, which have been found by the search. For example, the screen illustrated in the left of FIG. 6 is displayed on the display 41.

In Step S5, when the TV 1 has been selected from the list of connectable devices and the connection button has been pressed, the TV companion app 122 connects to the TV 1 via the network 131.

In Step S6, the TV companion app 122 saves the setting name and ID of the TV 1 acquired from the TV 1, in association with information that can identify the TV 1, such as an IP address. Data of a remote controller image acquired from the TV 1 is also saved in association with the IF address and the like.

After the information on the TV 1 is saved, the initial setting ends. The sequence of the initial setting may vary in operation/method according to the TV manufacturer. However, it is assumed that the TV companion app 122 have to have acquired an address (such as an IP address) that can identify a TV to be connected, as an internal parameter.

Figure 12:
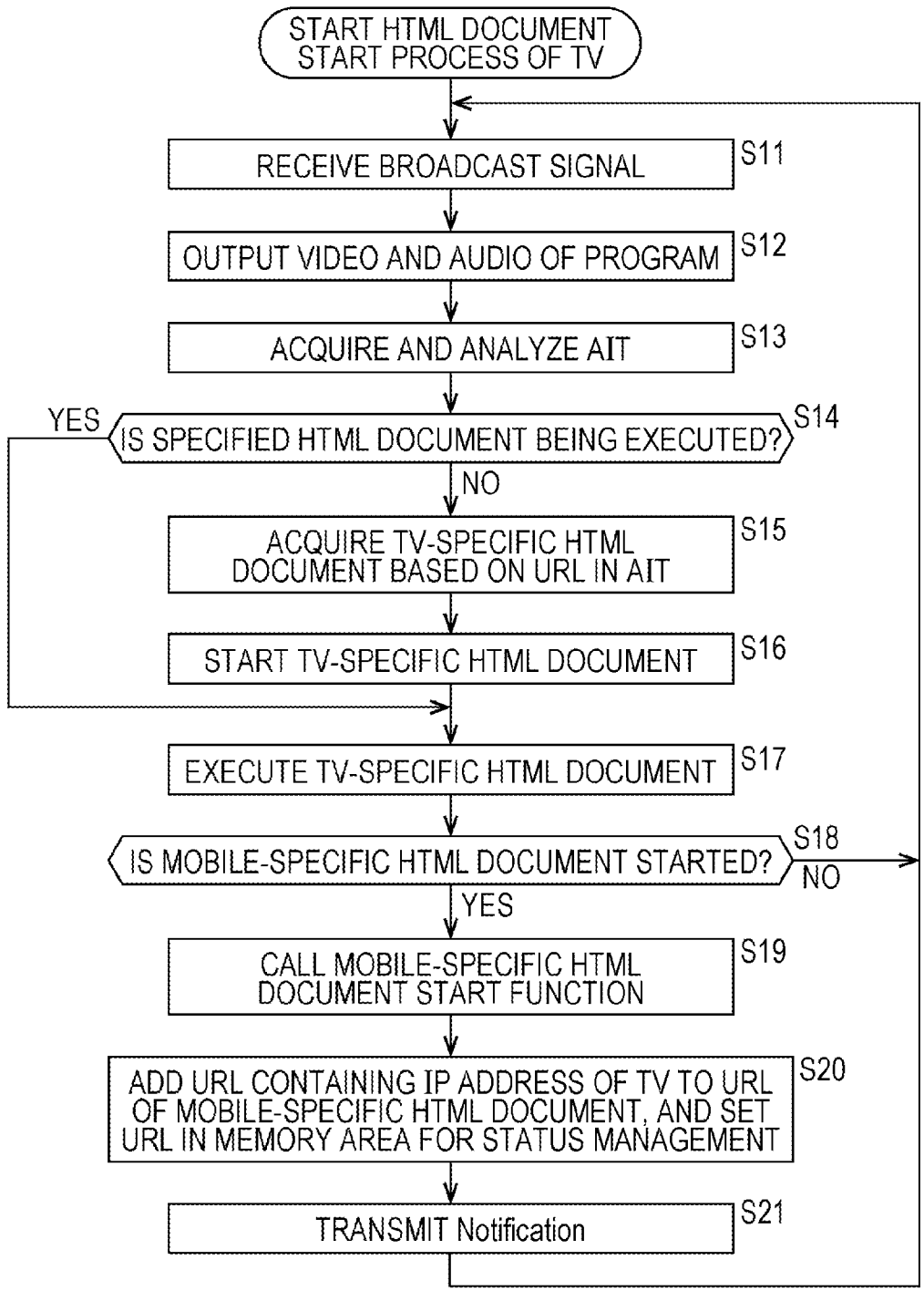
FIG. 12 is a flowchart illustrating the TV's process of starting the HTML documents.

Next, the TV 1's process of starting the HTML documents is described with reference to a flowchart of FIG. 12. The process is performed when the power of the TV 1 is ON and the TV platform 101 is in a state of being capable of executing the process.

In Step S11, the TV platform 101 receives a broadcast signal of a channel specified by the user through an operation on the mobile terminal 2. A demodulation process is performed on the broadcast signal. The video and audio of the program are output based on the video data and audio data obtained by the demodulation process.

In Step S13, the TV platform 101 acquires and analyzes an AIT included in the broadcast signal as additional information of the program. It is configured such that the AIT can specify URLs of a plurality of HTML documents such as a URL of an HTML document (Web app) in which an auto start flag is set, and a URL of an HTML document to be referred to in the HTML document. The URL of the TV-specific HTML document 11 obtained by analyzing the AIT is supplied from the TV platform 101 to the Web browser 21.

In Step S14, the Web browser 21 determines whether or not an HTML document specified by the broadcaster is being executed.

If it is determined in Step S14 that the specified HTML document is not being executed, in Step S15, the Web browser 21 accesses the Web app management server 4 based on the URL obtained by analyzing the AIT and acquires the TV-specific HTML document 11.

In Step S16, the Web browser 21 starts the acquired TV-specific HTML document 11.

In Step S17, the Web browser 21 executes the TV-specific HTML document 11. The TV-specific HTML document 11 superimposes and displays a Web page related to the program on the video of the program as illustrated in FIG. 3, based on, for example, the description of an HTML included in the TV-specific HTML document 11. Moreover, the TV-specific HTML document 11 executes JavaScript (registered trademark) included in the TV-specific HTML document 11 and calls a specified function.

If it is determined in Step S14 that the HTML document specified by the broadcaster is being executed, Steps S15 and S16 are skipped. The execution of the TV-specific HTML document 11 is continued in Step S17.

In Step S18, the TV-specific HTML document 11 determines whether or not to start the mobile-specific HTML document 12. Here, if the TV-specific HTML document 11 contains JavaScript (registered trademark) that calls a Web app start function being a function to start the mobile-specific HTML document 12, it is determined to start the mobile-specific HTML document 12.

If it is determined in Step S18 to start the mobile-specific HTML document 12, the TV-specific HTML document 11 calls the Web app start function being the API of the Web browser 21 in Step S19.

In Step S20, the Web browser 21 adds a URL containing the IP address of the TV 1 to the URL of the mobile-specific HTML document 12 in response to the call of the Web app start function, and sets the URL in a memory area for the management of the status of the TV 1. The URL of the mobile-specific HTML document 12 is passed from the TV-specific HTML document 11 to the Web browser 21 as an argument to the Web app start function.

FIG. 13 is a diagram illustrating an example of the Web app start function.

A function 201 of "navigator.receiverDevice.launchHTMLdocumentOnExternal (title,URL);" illustrated in the upper part is the Web app start function called in JavaScript (registered trademark) in the TV-specific HTML document 11. The function 201 specifies the process of adding the URL containing the IP address of the TV 1 to the URL of the mobile-specific HTML document 12 and transmitting the URL to the mobile terminal 2.

A URL 202 of "http://www.AAA.com/TV/index.html?tv-ipaddress=http://192.168.0.3/command/" illustrated in the lower part is the URL to which the URL containing the IP address of the TV 1 has been added. "http://www.AAA.com/TV/index.html" in the first half forming the URL 202 indicates the URL of the mobile-specific HTML document 12, that is, the URL for mobile terminal display. "?tv-ipaddress=http://192.168.0.3/command/" that is added in a query form indicates the URL containing the IP address of the TV 1 assigned in the network 131. In this example, "192.168.0.3" is the IP address assigned to the TV 1, and may include a port number as in "192.168.0.3:8080". "command/" is a character string indicating a path.

In this manner, the URL to which the URL containing the IP address of the TV 1 has been added is stored in the memory area for status management. As described below, the URL containing the IP address of the TV 1, which has been added to the URL, is used to specify a transmission destination when the mobile-specific HTML document 12 transmits an HTTP request to the HTTP server 111 of the TV 1.

The URL of the mobile-specific HTML document 12 is set in the memory area for status management. Then, in Step S21, the Web browser 21 transmits, to the mobile terminal 2, Notification being a signal notifying that data in the memory area for status management is present.

Afterward, return to Step S11 to repeat the above processing. For example, also in a case where the mobile-specific HTML document 12 has already been started, and it is determined in Step S18 not to start the mobile-specific HTML document 12, the processing after Step S11 is repeated.

Figure 14:
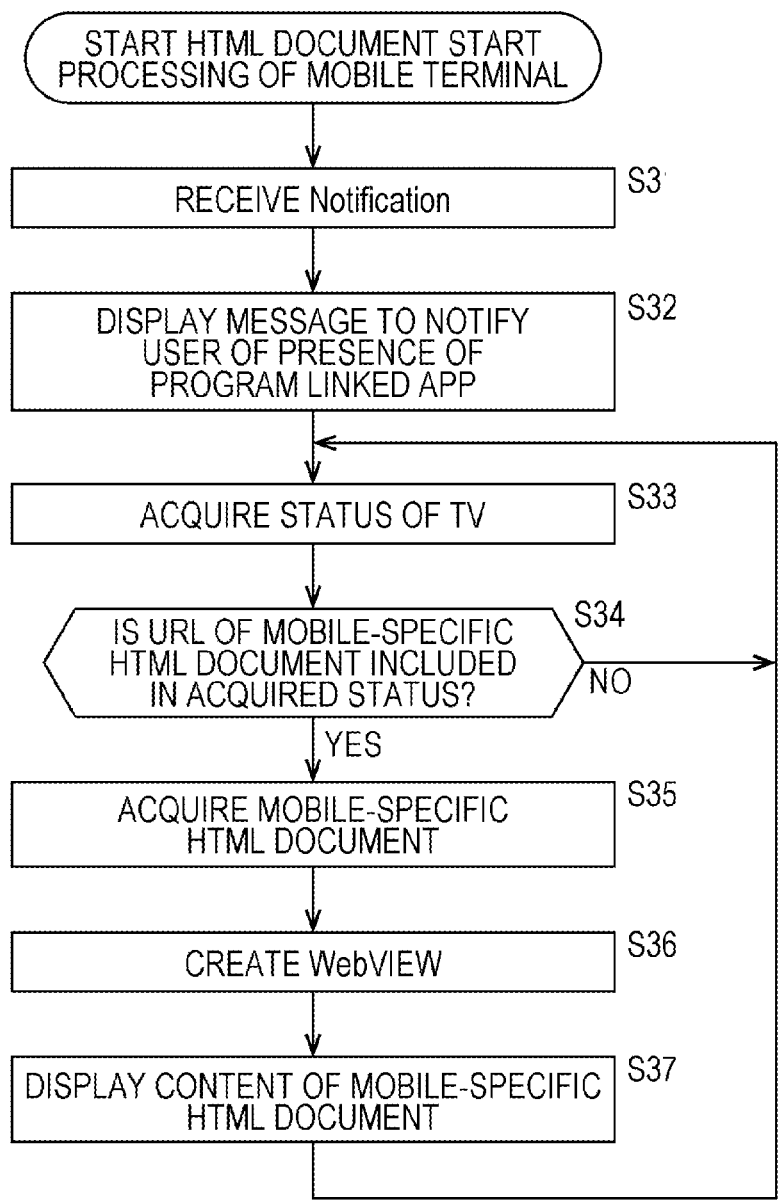
FIG. 14 is a flowchart illustrating the mobile terminal's process of starting the HTML document.

Next, the mobile terminal 2's process of starting the HTML document is described with reference to a flowchart of FIG. 14. The process of FIG. 14 is performed, for example, after the process of FIG. 13 is performed by the TV 1. In the mobile terminal 2, the TV companion app 122 is assumed to be running.

In Step S31, the TV companion app 122 receives Notification transmitted from the Web browser 21 of the TV 1.

In Step S32, the TV companion app 122 displays a message as described with reference to FIG. 7, and notifies the user that a program linked app is present.

In Step S33, the TV companion app 122 acquires information on the status of the TV 1 by, for example, a method unique to the manufacturer. For example, getTVstatus(URL) being a command indicating a request for information set in the memory area for the management of the status of the TV 1 is issued from the TV companion app 122 to the TV platform 101. The TV platform 101 transmits, to the TV companion app 122, the information set in the memory area for status management.

In Step S34, the TV companion app 122 determines whether or not the information on the status acquired from the TV 1 contains the URL of the mobile-specific HTML document 12. If the process of FIG. 12 is being performed by the TV 1, the URL 202 to which the IP address has been added is transmitted from the TV 1. The TV companion app 122 provides the URL for mobile terminal display included in the first half of the URL 202 to the WebView 22, and causes the WebView 22 to acquire the mobile-specific HTML document 12.

If it is determined in Step S34 that the URL of the mobile-specific HTML document 12 is included, in Step S35, the WebView 22 accesses the Web app management server 4 based on the URL provided from the TV companion app 122, and acquires and executes the mobile-specific HTML document 12.

In Step S36, the TV companion app 122 creates a WebView for displaying a Web page related to a program based on the mobile-specific HTML document 12.

In Step S37, the TV companion app 122 performs a display using the Web page related to the program, the Web page being the content of the mobile-specific HTML document 12.

From the above processing, as described with reference to FIG. 10, the TV-specific HTML document 11 and the mobile-specific HTML document 12 enter into states of having been executed in the TV 1 and the mobile terminal 2, respectively. For example, the content of the TV-specific HTML document 11, together with the video of the program, is displayed on the display 31 of the TV 1. The content of the mobile-specific HTML document 12 is displayed on the display 41 of the mobile terminal 2.

[Communication Between HTML Documents of TV 1 and Mobile Terminal 2]

Next, communication between HTML documents is described.

A broadcaster can freely decide data to be transmitted/received between HTML documents. For example, a URL of an HTML document to cause the WebView 22 to newly acquire is transmitted from the TV-specific HTML document 11 to the mobile-specific HTML document 12. Moreover, information indicating the content of a user's operation on a Web page displayed on the mobile terminal 2 is transmitted from the mobile-specific HTML document 12 to the TV-specific HTML document 11.

Firstly, a process on the TV 1 side is described.

FIG. 15 is a diagram illustrating an example of an API of the Web browser 21.

A function 211 of "navigator.receiverDevice.sendTextToExternalDevice("data");" in the upper part is called by the TV-specific HTML document 11 upon data transmission. The function 211 is called and accordingly data to be transmitted from the TV-specific HTML document 11 to the mobile-specific HTML document 12 is set in a specific area of the memory. The specific area is overwritten when a next API is called. The specific area becomes null upon page transition.

When an HTTP request using the WebAPI is issued from the mobile terminal 2, transmission target data set in the specific area is transmitted as a response to the HTTP request from the HTTP server 111 to the mobile terminal 2.

A function 212 of "navigator.receiverDevice.receiveTextFromExternalDevice("data");" in the lower part is called when the HTTP server 111 has received data transmitted from the mobile terminal 2. The function 212 is called and accordingly the data is passed from the HTTP server 111 to the TV-specific HTML document 11 via the Web browser 21.

Figure 16:
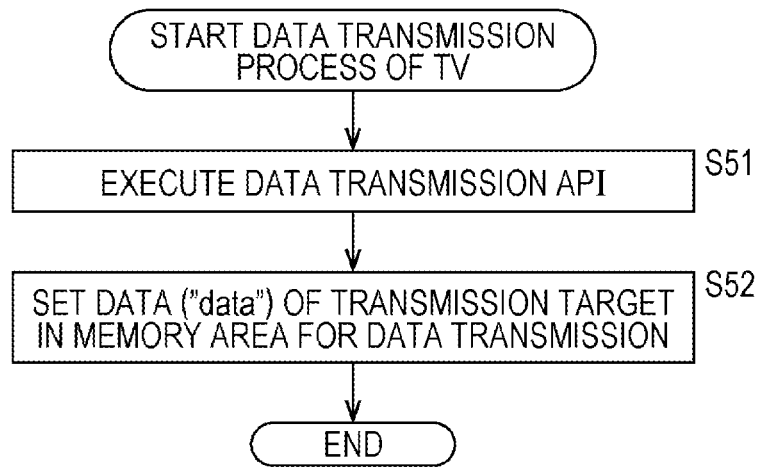
FIG. 16 is a flowchart illustrating the TV's process upon data transmission.

The TV 1's process upon data transmission is described with reference to a flowchart of FIG. 16.

In Step S51, the TV-specific HTML document 11 executes a data transmission API. In other words, the TV-specific HTML document 11 calls the function 211 of FIG. 15 with the transmission target data as an argument.

In Step S52, the Web browser 21 sets the transmission target data in the specific area of the memory. The transmission target data is set in the specific area of the memory. Then, the process ends.

Figure 17:
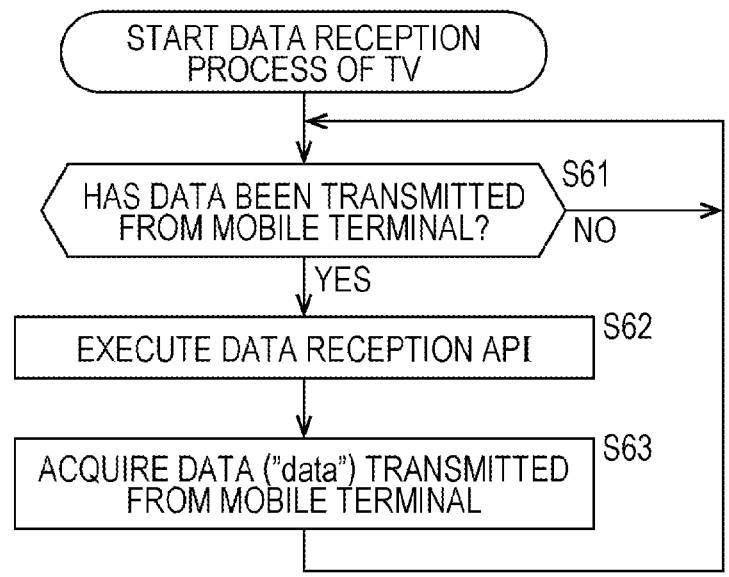
FIG. 17 is a flowchart illustrating the TV's process upon data reception.

The TV 1's process upon data reception is described with reference to a flowchart of FIG. 17.

In Step S61, the HTTP server 111 determines whether or not data has been transmitted from the mobile terminal 2, and waits until determining that data has been transmitted.

If having determined in Step S61 that data was transmitted from the mobile terminal 2, the HTTP server 111 executes a data reception API in Step S62. In other words, the HTTP server 111 calls the function 212 of FIG. 15 with the transmitted data as an argument. The Web browser 21 outputs, to the TV-specific HTML document 11, the data transmitted from the mobile terminal 2 and received by the HTTP server 111.

In Step S63, the TV-specific HTML document 11 acquires the data supplied from the mobile terminal 2 via the Web browser 21. Afterward, return to Step S61 to repeat the above processing.

Next, the process on the mobile terminal 2 side is described.

Figure 18:
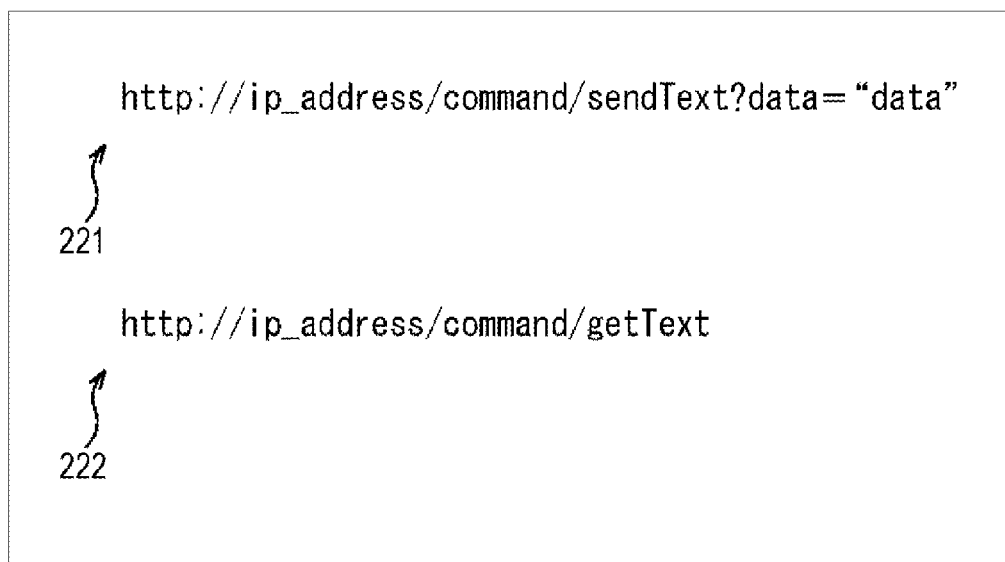
FIG. 18 is a diagram illustrating an example of an HTTP request.

FIG. 18 is a diagram illustrating an example of an HTTP request issued by the mobile-specific HTML document 12.

An HTTP request 221 of "http://ip_address/command/sendText?data="data"" in the upper part is an HTTP request for data transmission issued by the mobile-specific HTML document 12 upon data transmission. The HTTP request 221 contains an IP address that specifies a transmission destination of the HTTP request, and transmission target data. Moreover, "http://ip_address/command" is a transmission destination URL received from the TV 1. "sendText" is a path for data transmission. Data desired to send in a query form is attached thereto.

An HTTP request 222 of "http://ip_address/command/getText" in the lower part is an HTTP request for data reception issued by the mobile-specific HTML document 12 upon data reception. The HTTP request 222 requests a return of the data set in the specific area of the memory in the TV 1, as a response. The HTTP request 222 contains an IP address that specifies a transmission destination of the HTTP request. Moreover, "http://ip_address/command" is a transmission destination URL received from the TV 1. "getText" is a path for data reception.

When the URL of the mobile-specific HTML document 12 is notified to the mobile terminal 2 as the URL (http://ip_address/command/) included in the HTTP requests for data transmission and data reception, the URL containing the IP address to which the TV 1 has added to the URL is used. In the example of FIG. 13, "http://192.168.0.3/command/" is set in the HTTP request.

For example, when the URL of the mobile-specific HTML document 12 to which the URL containing the IP address has been added has been notified by the TV 1, the URL containing the IP address of the TV 1 is extracted and managed by the TV companion app 122. The TV companion app 122 provides the URL containing the IP address extracted from the URL to the mobile-specific HTML document 12 at a predetermined timing.

Figure 19:
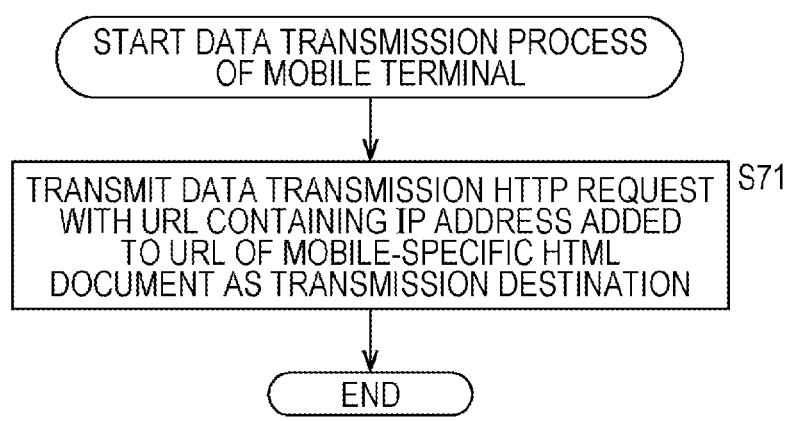
FIG. 19 is a flowchart illustrating the mobile terminal s process upon data transmission.

The mobile terminal 2's process upon data transmission is described with reference to a flowchart of FIG. 19.

In Step S71, the mobile-specific HTML document 12 transmits an HTTP request for data transmission including, as a transmission destination, the URL containing the IP address of the TV 1 notified being added to the URL. The HTTP request for data transmission includes transmission target data.

After the HTTP request for data transmission is transmitted, the process ends. In the TV 1, the process upon data reception described with reference to FIG. 17 is performed. The TV-specific HTML document 11 acquires data transmitted, included in the HTTP request, by the mobile-specific HTML document 12.

Figure 20:
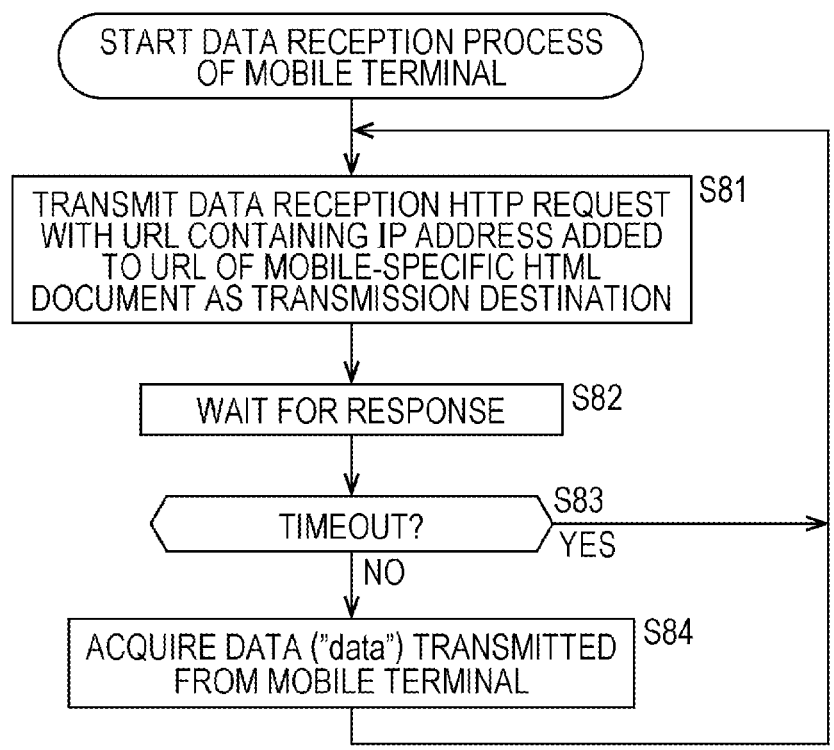
FIG. 20 is a flowchart illustrating the mobile terminal's process upon data reception.

Next, the mobile terminal 2's process upon data reception is described with reference to a flowchart of FIG. 20.

In Step S81, the mobile-specific HTML document 12 transmits an HTTP request for data reception including, as a transmission destination, the URL containing the IP address of the TV 1 notified being added to the URL.

In Step S82, the mobile-specific HTML document 12 waits for a response from the HTTP server 111.

In Step S83, the mobile-specific HTML document 12 determines whether or not that a timeout has occurred. For example, if a response to the HTTP request is not transmitted within a predetermined time period, it is determined that a timeout has occurred.

If it is determined in Step S83 that a timeout has not occurred, the mobile-specific HTML document 12 receives the data included in the response to the HTTP request for data reception and transmitted from the TV 1, in Step S84.

After the data transmitted from the TV 1 is received in Step S84, or after it is determined in Step S83 that a timeout has occurred, the processing returns to Step S81 to repeat the above processing.

Figure 21:
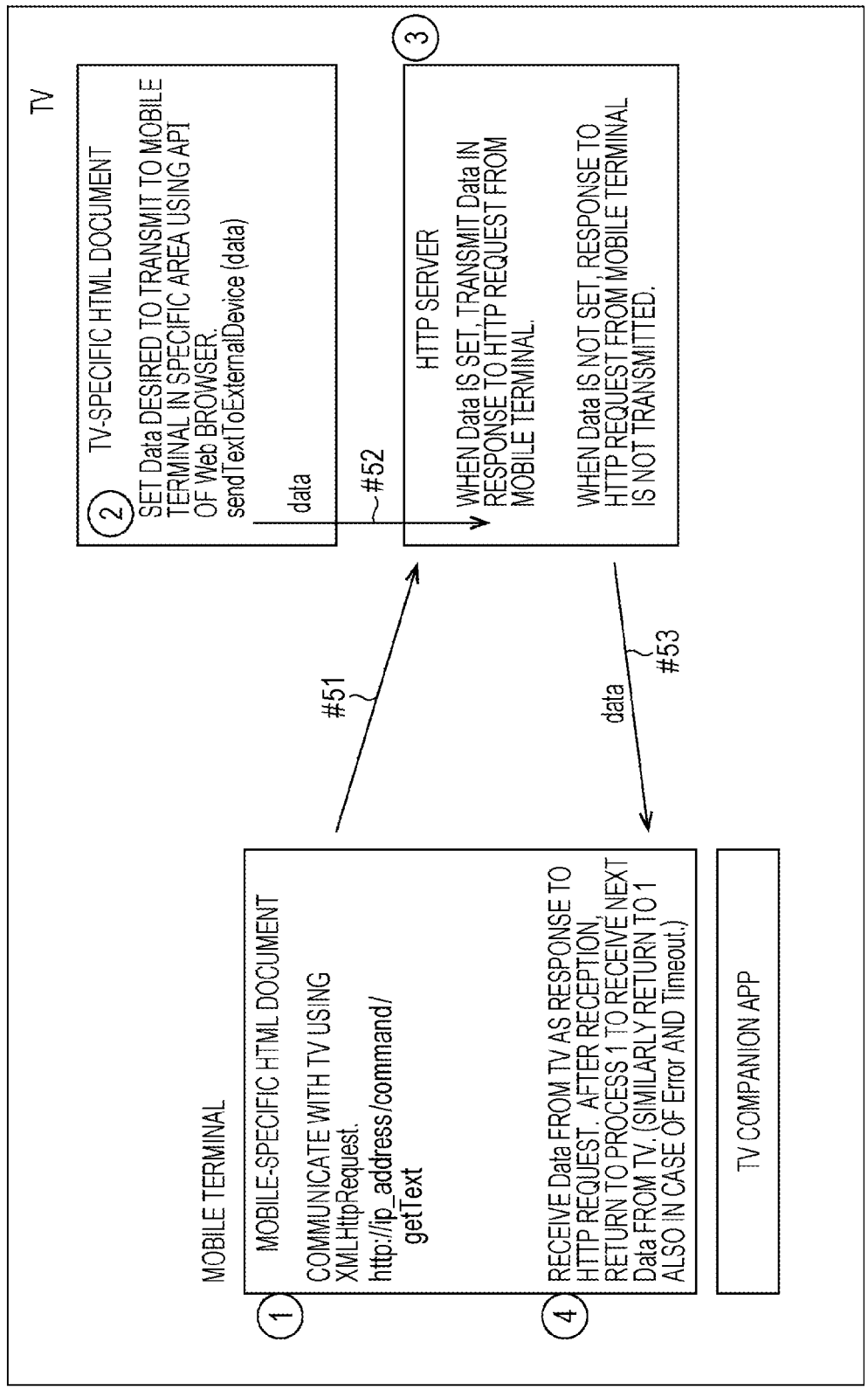
FIG. 21 is a diagram illustrating the flow of communication between the HTML documents.
Figure 22:
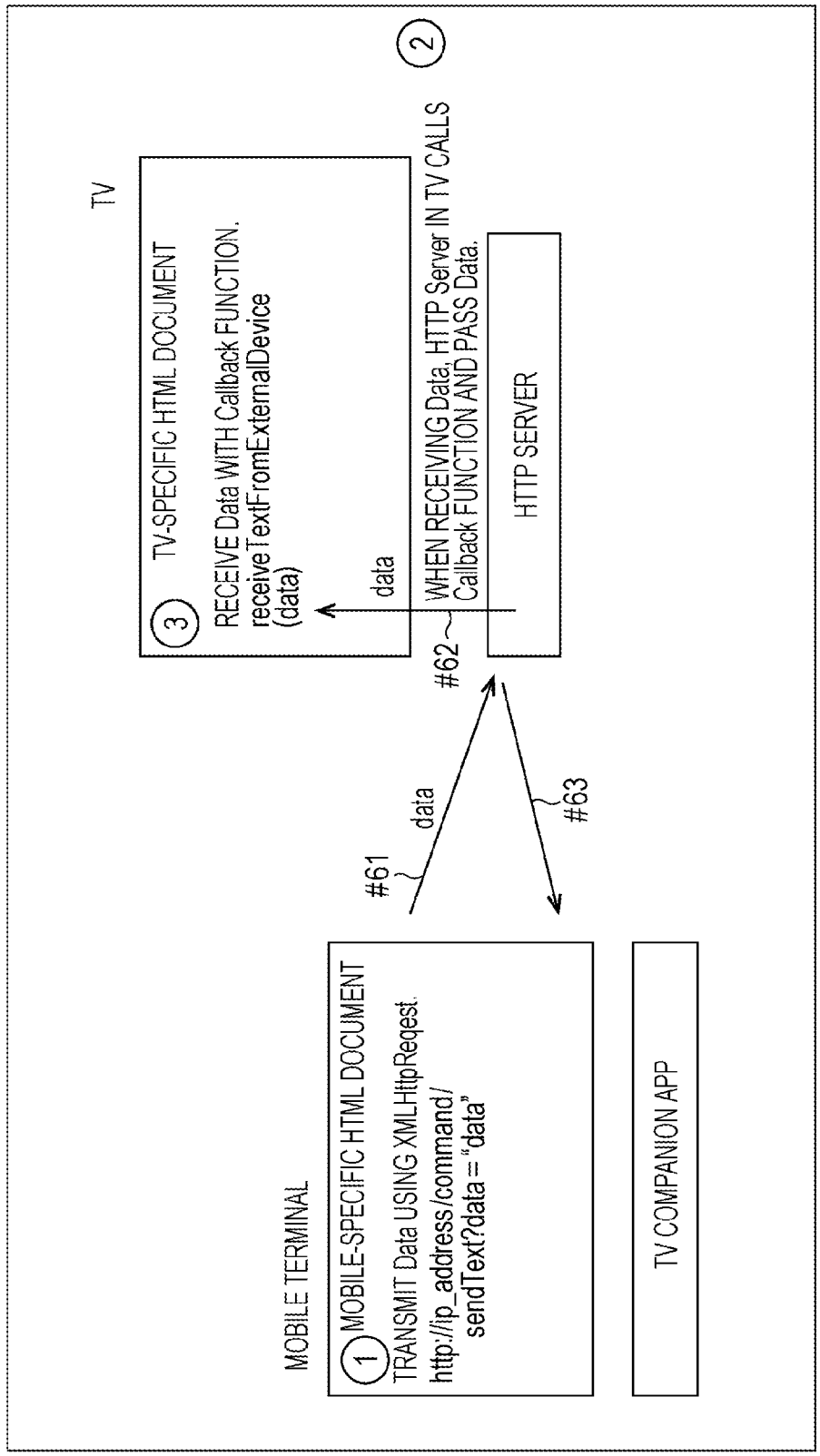
FIG. 22 is another diagram illustrating the flow of communication between the HTML documents.

FIGS. 21 and 22 are diagrams illustrating the flow of communication between HTML documents. FIG. 21 illustrates the flow upon data transmission from the TV-specific HTML document 11 to the mobile-specific HTML document 12. FIG. 22 illustrates the flow upon data transmission from the mobile-specific HTML document 12 to the TV-specific HTML document 11.

The flow upon data transmission from the TV-specific HTML document 11 to the mobile-specific HTML document 12 is described with reference to FIG. 21. Basically, the processing on the right side of FIG. 21 corresponds to the TV 1's process described with reference to FIG. 16. Moreover, the processing on the left side of FIG. 21 corresponds to the mobile terminal 2's process described with reference to FIG. 20.

As illustrated as a process 1, the mobile-specific HTML document 12 of the mobile terminal 2 transmits an HTTP request (XMLHttpRequest) for data reception including, as the transmission destination, the URL containing the IP address of the TV 1 notified being added to the URL. The HTTP request for data reception is received by the HTTP server 111 of the TV 1 as pointed by an arrow #51.

As illustrated as a process 2, the TV-specific HTML document 11 of the TV 1 sets transmission target data to the mobile terminal 2 in the specific area of the memory using the data transmission API. Having been set in the specific area, the transmission target data is provided from the TV-specific HTML document 11 to the HTTP server 111 as indicated by an arrow #52.

As illustrated as a process 3, the HTTP server 111 of the TV 1 transmits the transmission target data, integrating it into a response to the HTTP request from the mobile-specific HTML document 12, when the transmission target data is set in the specific area of the memory. If the transmission target data is not set, the HTTP server 111 does not transmit a response to the mobile-specific HTML document 12.

As pointed by an arrow #53, the response from the HTTP server 111 is received by the mobile-specific HTML document 12 of the mobile terminal 2. The mobile-specific HTML document 12 receives the data integrated in the response to the HTTP request for data reception and transmitted from the TV 1. Afterward, return to the process 1 to repeat the above processing.

The flow upon data transmission from the mobile-specific HTML document 12 to the TV-specific HTML document 11 is described with reference to FIG. 22. Basically, the processing on the right side of FIG. 22 corresponds to the TV 1's process described with reference to FIG. 17. Moreover, the processing on the left side of FIG. 22 corresponds to the mobile terminal 2's process described with reference to FIG. 19.

As illustrated as a process 1, the mobile-specific HTML document 12 of the mobile terminal 2 transmits an HTTP request for data transmission including, as a transmission destination, the URL containing the IP address of the TV 1 notified being added to the URL. The HTTP request for data transmission including transmission target data is received by the HTTP server 111 of the TV 1 as pointed by an arrow #61.

As illustrated as a process 2, the HTTP server 111 of the TV 1 calls the function 212 of FIG. 15 being a Callback function when having received the HTTP request for data transmission. Consequently, the HTTP server 111 provides the data integrated in the HTTP request for data transmission and transmitted from the mobile terminal 2, to the TV-specific HTML document 11 as indicated by an arrow #62. Moreover, the HTTP server 111 transmits a response to the HTTP request to the mobile-specific HTML document 12 as indicated by an arrow #63.

As illustrated as a process 3, the Callback function is called and accordingly the TV-specific HTML document 11 receives the data provided from the HTTP server 111.

Such communication between HTML documents as described above is used to transmit and receive various pieces of information specified by the broadcaster between the TV 1 and the mobile terminal 2, based on the descriptions of the TV-specific HTML document 11 and the mobile-specific HTML document 12.

<Configuration Examples of Devices]
[Configuration Example of TV 1]

Figure 23:
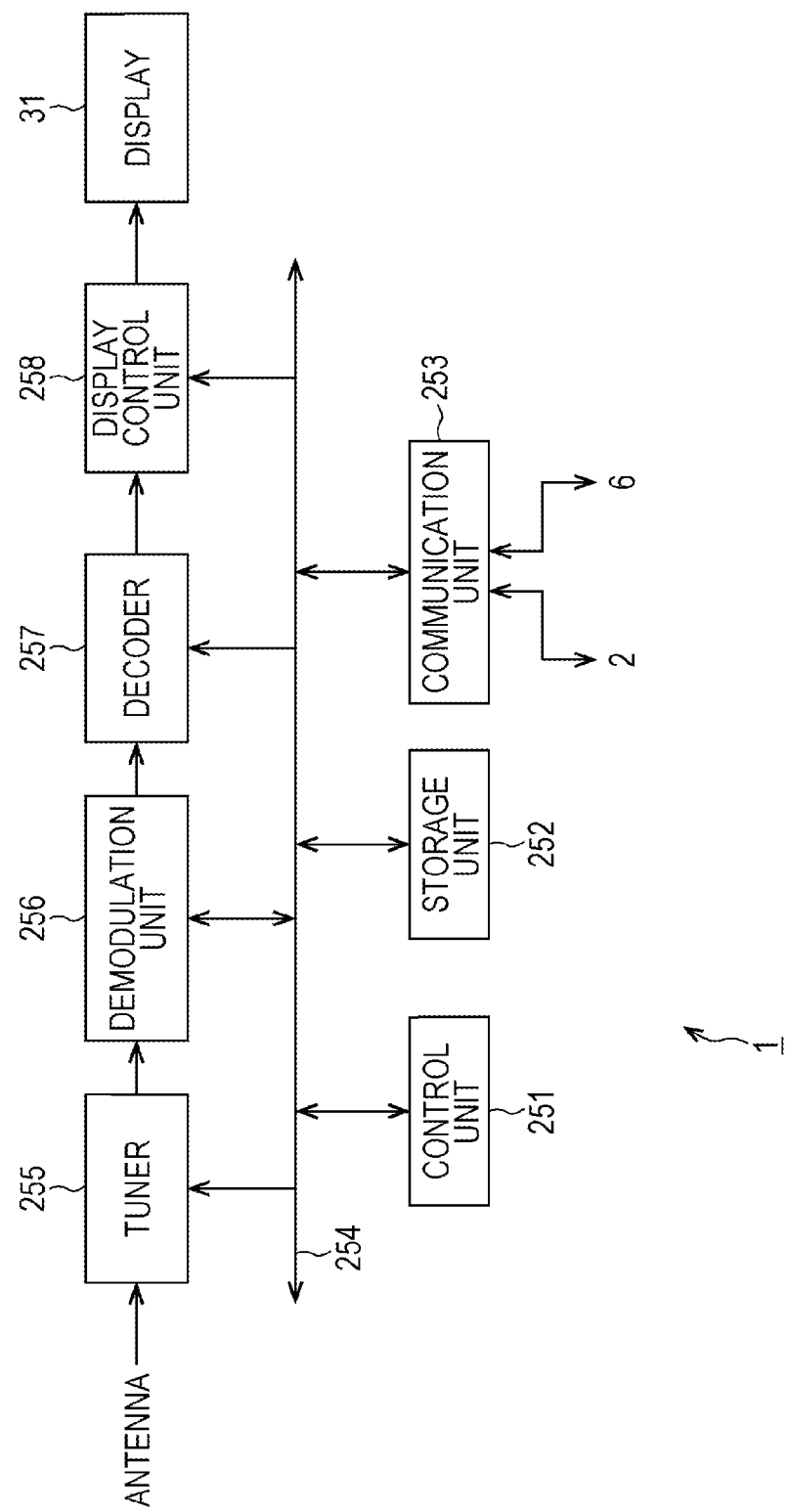
FIG. 23 is a block diagram illustrating a hardware configuration example of the TV.

FIG. 23 is a block diagram illustrating a hardware configuration example of the TV 1.

The TV 1 is composed of a control unit 251, a storage unit 252, a communication unit 253, a tuner 255, a demodulation unit 256, a decoder 257, and a display control unit 258, in addition to the display 31. The tuner 255, the demodulation unit 256, the decoder 257, and the display control unit 258 are connected to the control unit 251 via a bus 254. The bus 254 is also connected to the storage unit 252 and the communication unit 253.

The control unit 251 is composed of a CPU (Central Processing Unit), a ROM (Read Only Memory), a RAM (Random Access Memory), and the like. The control unit 251 achieves the TV function by, for example, executing programs stored in the ROM and the storage unit 252, constructing the TV platform 101, and controlling the tuner 255, the demodulation unit 256, the decoder 257, and the display control unit 258. Moreover, the control unit 251 executes the Web browser 21 on the TV platform 101, and also executes the TV-specific HTML document 11 on the Web browser 21.

A memory area for the management of the status of the TV 1 and a specific area where transmission target data to the mobile terminal 2 is set are secured in, for example, the RAM of the control unit 251.

The storage unit 252 includes a hard disk or flash memory, and stores various programs to be executed by the control unit 251.

The communication unit 253 includes a wireless LAN interface, and communicates with the mobile terminal 2 via the network 131 in accordance with the control of the control unit 251. Moreover, the communication unit 253 communicates with the Web app management server 4 via the Internet 6 in accordance with the control of the control unit 251. The communication unit 253 outputs, to the control unit 251, the TV-specific HTML document 11 acquired from the Web app management server 4.

The tuner 255 selects a signal of a predetermined channel from a broadcast signal received and supplied by an unillustrated antenna, and outputs the signal to the demodulation unit 256.

The demodulation unit 256 performs a demodulation process on the broadcast signal supplied from the tuner 255, and outputs data of the video and audio of a program to the decoder 257. The demodulation unit 256 also acquires additional information of the program such as an AIT. The AIT acquired by the demodulation unit 256 is supplied to the control unit 251.

The decoder 257 decodes data encoded in a predetermined encoding format, which has been supplied from the demodulation unit 256, and outputs the decoded video data to the display control unit 258. The audio data of the program obtained by the decoder 257 is supplied to an unillustrated speaker and output.

The display control unit 258 causes the display 31 to display the video of the program based on the video data supplied from the decoder 257. Moreover, the display control unit 258 causes the display 31 to display a Web page based on the mobile-specific HTML document 12 in accordance with the control of the control unit 251.

Figure 24:
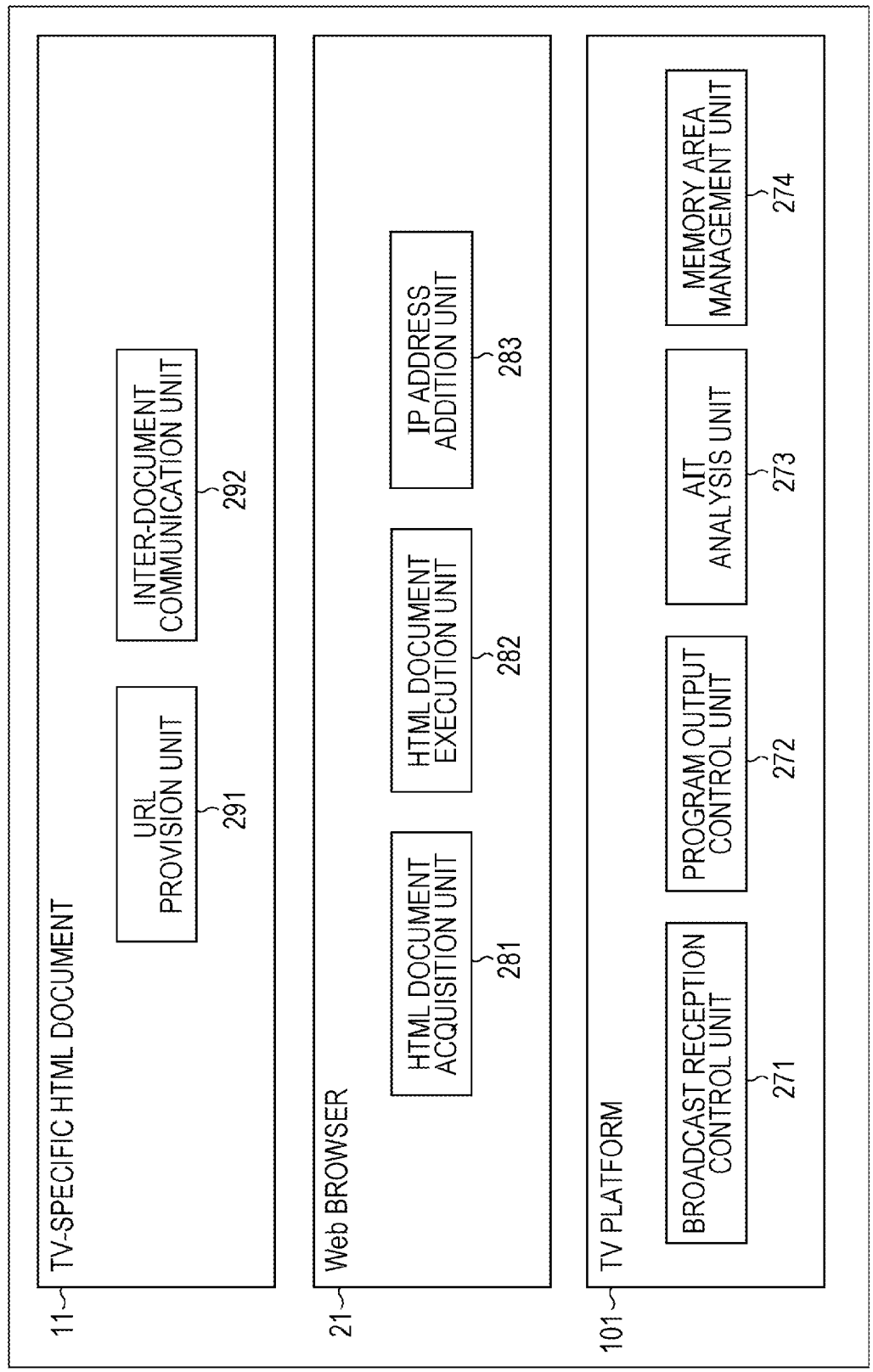
FIG. 24 is a block diagram illustrating a functional configuration example of the TV.

FIG. 24 is a block diagram illustrating a functional configuration example of the TV 1. At least a part of the functional units illustrated in FIG. 24 is realized by the CPU of the control unit 251 executing a predetermined program.

In the TV platform 101, a broadcast reception control unit 271, a program output control unit 272, an AIT analysis unit 273, and a memory area management unit 274 are realized.

The broadcast reception control unit 271 controls the tuner 255 to cause it to receive a broadcast signal of a predetermined channel.

The program output control unit 272 controls the output of a program. For example, the program output control unit 272 causes the demodulation unit 256 to demodulate a broadcast signal and causes the decoder 257 to decode the video data and audio data of the program. Moreover, the program output control unit 272 controls the display control unit 258 and causes the display 31 to display the video of the program.

The AIT analysis unit 273 acquires and analyzes the AIT extracted by the demodulation unit 256. The URL of the TV-specific HTML document 11 obtained by the analysis of the AIT analysis unit 273 is provided to the Web browser 21.

The memory area management unit 274 manages the memory area for the management of the status of the TV 1 and the specific area where transmission target data to the mobile terminal 2 is set, which have been secured in the RAM or the like of the control unit 251. For example, the memory area management unit 274 stores and manages, in the memory area for status management, the URL of the mobile-specific HTML document 12 to which the URL containing the IP address of the TV 1 has been added by the Web browser 21. Moreover, the memory area management unit 274 stores and manages, in the specific area, data to be transmitted to the mobile terminal 2 by the communication between HTML documents.

In the TV platform 101, a functional unit that responds to a device search by the TV companion app 122 of the mobile terminal 2, a functional unit that manages the HTTP server function, and the like are also realized.

In the Web browser 21, an HTML document acquisition unit 281, an HTML document execution unit 282, and an IP address addition unit 283 are realized.

The HTML document acquisition unit 281 acquires the TV-specific HTML document 11 from the Web app management server 4 based on the URL obtained by the analysis of the AIT analysis unit 273.

The HTML document execution unit 282 executes the TV-specific HTML document 11 acquired by the HTML document acquisition unit 281. The HTML document execution unit 282 also performs things such as the display of a Web page related to the program.

The IP address addition unit 283 adds the URL containing the IP address of the TV 1 to the URL of the mobile-specific HTML document 12 provided from the TV-specific HTML document 11 when the Web app start function has been called. The IP address addition unit 283 sets the URL to which the URL containing the IP address has been added, in the memory area for status management managed by the memory area management unit 274.

In the Web browser 21, a functional unit that transmits Notification to the mobile terminal 2, and the like are also realized.

In the TV-specific HTML document 11, a URL provision unit 291 and an inter-document communication unit 292 are realized.

The URL provision unit 291 is realized by executing JavaScript (registered trademark) in the TV-specific HTML document 11, and calls the Web app start function with the URL included in the TV-specific HTML document 11 as an argument. The URL provision unit 291 corresponds to a functional unit that provides the URL of the mobile-specific HTML document 12 to the TV 1.

The inter-document communication unit 292 is realized by executing JavaScript (registered trademark) in the TV-specific HTML document 11, and performs communication between HTML documents on the mobile-specific HTML document 12. The inter-document communication unit 292 calls the function 211 of FIG. 15 being a function for data transmission when transmitting data to the mobile terminal 2. Moreover, when receiving data transmitted from the mobile terminal 2, the inter-document communication unit 292 acquires data provided from the HTTP server 111 by the function 212 of FIG. 15 being a function for data reception is called.

[Configuration Example of Mobile Terminal 2]

Figure 25:
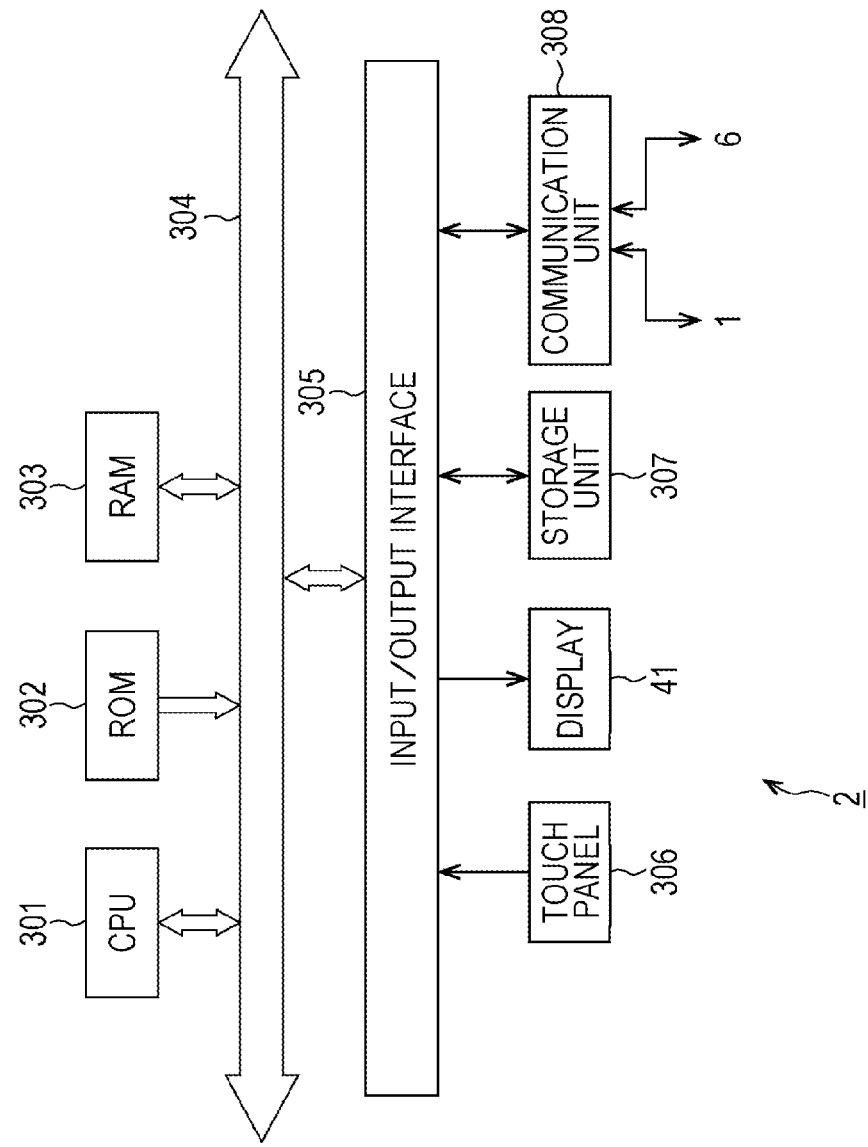
FIG. 25 is a block diagram illustrating a hardware configuration example of the mobile terminal.

FIG. 25 is a block diagram illustrating a hardware configuration example of the mobile terminal 2.

A CPU 301, a ROM 302, and a RAM 303 are mutually connected by a bus 304. The CPU 301 executes programs stored in the ROM 302 and the storage unit 307, constructs the mobile platform 121, and controls the operation of the entire mobile terminal 2. Moreover, the CPU 301 executes the TV companion app 122 and the WebView 22 on the mobile platform 121, and executes the mobile-specific HTML document 12 on the WebView 22.

An input/output interface 305 is connected to the bus 304. A touch panel 306, a storage unit 307, and a communication unit 308, in addition to the display 41, are connected to the input/output interface 305.

The touch panel 306 is provided laminated on the display 41, and outputs a signal indicating the content of a user's operation. The signal output from the touch panel 306 is supplied to the CPU 301.

The storage unit 307 includes a flash memory, and stores various programs to be executed by the CPU 301. The TV companion app 122 downloaded and installed from the native app management server 5 is also stored in the storage unit 307. The data stored in the storage unit 307 is read by the CPU 301 as appropriate.

The communication unit 308 includes a wireless LAN interface, and communicates with the TV 1 via the network 131 in accordance with the control of the CPU 301. Moreover, the communication unit 308 communicates with the Web app management server 4 and the native app management server 5 via the Internet 6 in accordance with the control of the CPU 301. The communication unit 308 outputs, to the CPU 301, the mobile-specific HTML document 12 acquired from the Web app management server 4.

Figure 26:
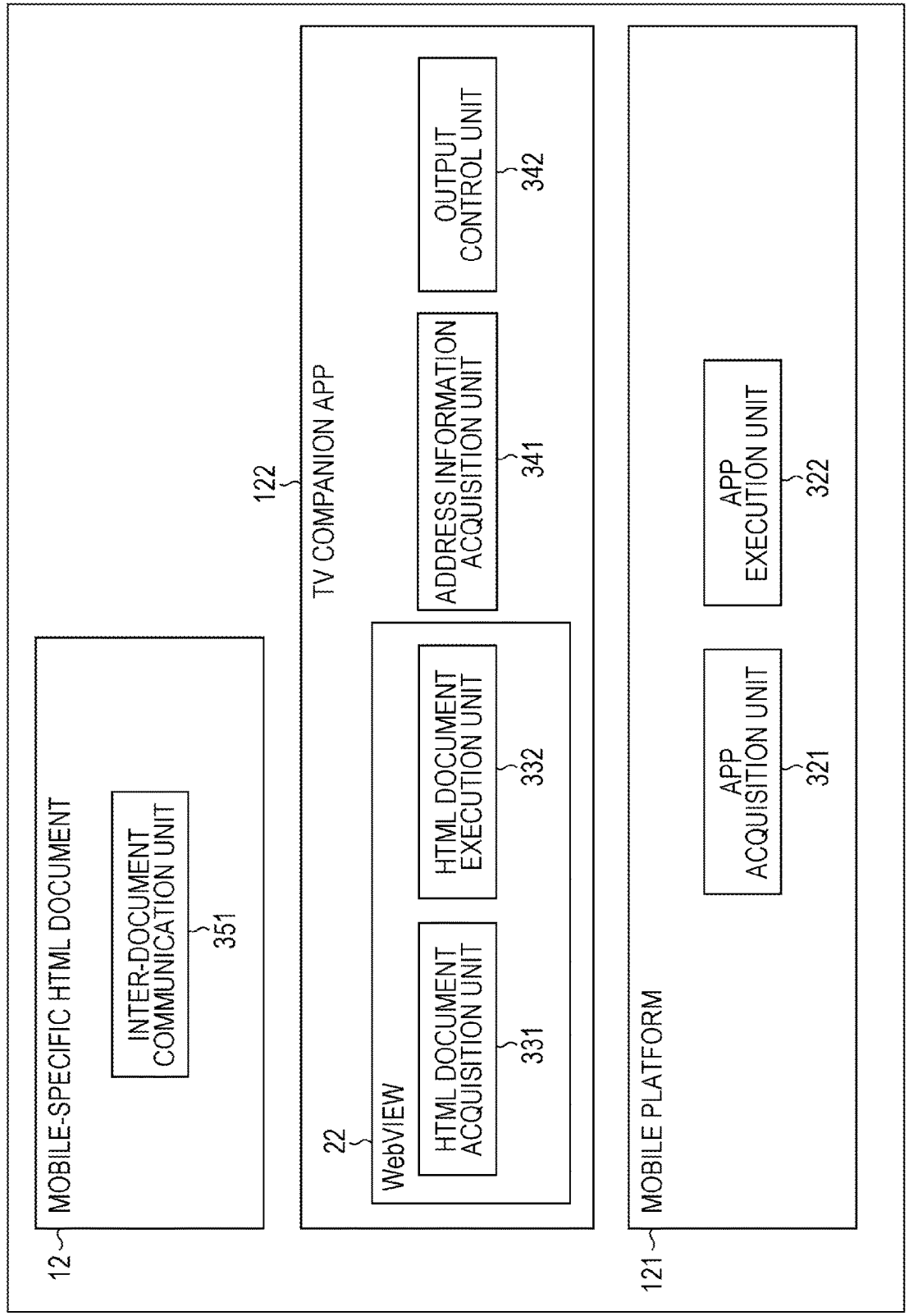
FIG. 26 is a block diagram illustrating a functional configuration example of the mobile terminal.

FIG. 26 is a block diagram illustrating a functional configuration example of the mobile terminal 2. At least a part of the functional units illustrated in FIG. 26 is realized by the CPU 301 executing a predetermined program.

In the mobile platform 121, an app acquisition unit 321 and an app execution unit 322 are realized.

The app acquisition unit 321 installs the TV companion app 122 acquired from the native app management server 5.

The app execution unit 322 executes various applications such as the TV companion app 122 including the WebView 22.

In the WebView 22, an HTML document acquisition unit 331 and an HTML document execution unit 332 are realized.

The HTML document acquisition unit 331 acquires the mobile-specific HTML document 12 from the Web app management server 4 based on the URL acquired by the TV companion app 122 from the TV 1.

The HTML document execution unit 332 executes the mobile-specific HTML document 12 acquired by the HTML document acquisition unit 331. The HTML document execution unit 332 also performs things such as the display of a Web page related to the program.

In the TV companion app 122, an address information acquisition unit 341 and an output control unit 342 are realized.

The address information acquisition unit 341 acquires information on the status of the TV 1. The address information acquisition unit 341 provides the URL of the mobile-specific HTML document 12 included in the status information to the WebView 22, and provides the URL containing the IP address of the TV 1, which has been added to the URL, to the mobile-specific HTML document 12.

The output control unit 342 uses the function of the WebView 22 and displays a Web page related to the program based on the mobile-specific HTML document 12.

In the mobile-specific HTML document 12, an inter-document communication unit 351 is realized.

The inter-document communication unit 351 is realized by executing JavaScript (registered trademark) in the mobile-specific HTML document 12, and performs communication between HTML documents on the TV-specific HTML document 11. The inter-document communication unit 351 issues the HTTP request 221 of FIG. 18 being an HTTP request for data transmission when transmitting data to the TV 1. Moreover, the inter-document communication unit 351 issues the HTTP request 222 of FIG. 18 being an HTTP request for data reception when receiving data transmitted from the TV 1.

[Configuration Example of Web App Management Server 4]

Figure 27:
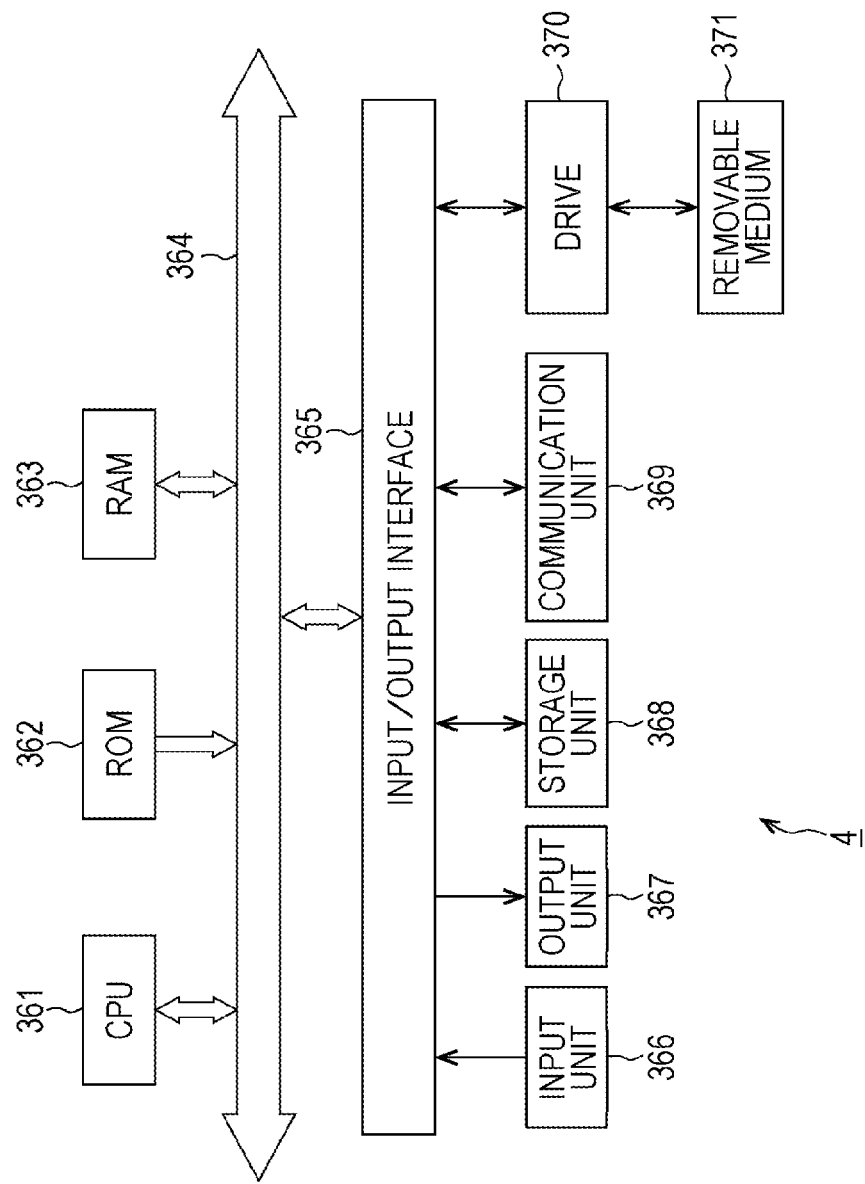
FIG. 27 is a block diagram illustrating a configuration example of a Web app management server.

FIG. 27 is a block diagram illustrating a configuration example of the Web app management server 4.

A CPU 361, a ROM 362, and a RAM 363 are mutually connected by a bus 364. The bus 364 is further connected to an input/output interface 365. The input/output interface 365 is connected to an input unit 366 including a keyboard and a mouse, and an output unit 367 including a display and a speaker. Moreover, a storage unit 368, a communication unit 369, and a drive 370 are also connected to the input/output interface 365.

The storage unit 368 stores the TV-specific HTML document 11 and the mobile-specific HTML document 12 with a hard disk or the like. The communication unit 369 communicates with the TV 1 and the mobile terminal 2 via the Internet 6.

The communication unit 369 transmits the TV-specific HTML document 11 stored in the storage unit 368 to the TV 1 when being accessed from the TV 1 based on the URL contained in the AIT. Moreover, the communication unit 369 transmits the mobile-specific HTML document 12 stored in the storage unit 368 to the mobile terminal 2 when being accessed from the mobile terminal 2 based on the URL notified by the TV 1.

The drive 370 captures information from a removable medium 371 formed of an optical disc or memory card. Data captured by the drive 370, such as an HTML document, is supplied to and stored in the storage unit 368.

The native app management server 5 also has a similar configuration to that of the Web app management server 4 illustrated in FIG. 27. The data of the TV companion app 122 to be provided to the mobile terminal 2 is stored in a storage unit included in the native app management server 5.

Modification

[Regarding Communication Between HTML Documents Using WebSockets]

In the above description, XMLHttpRequest is used between HTML documents. However, a protocol such as WebSockets may be used. WebSockets is a protocol for achieving two-way communication between a server and a client, and makes it possible to push data from the server side to the client side.

Figure 28:
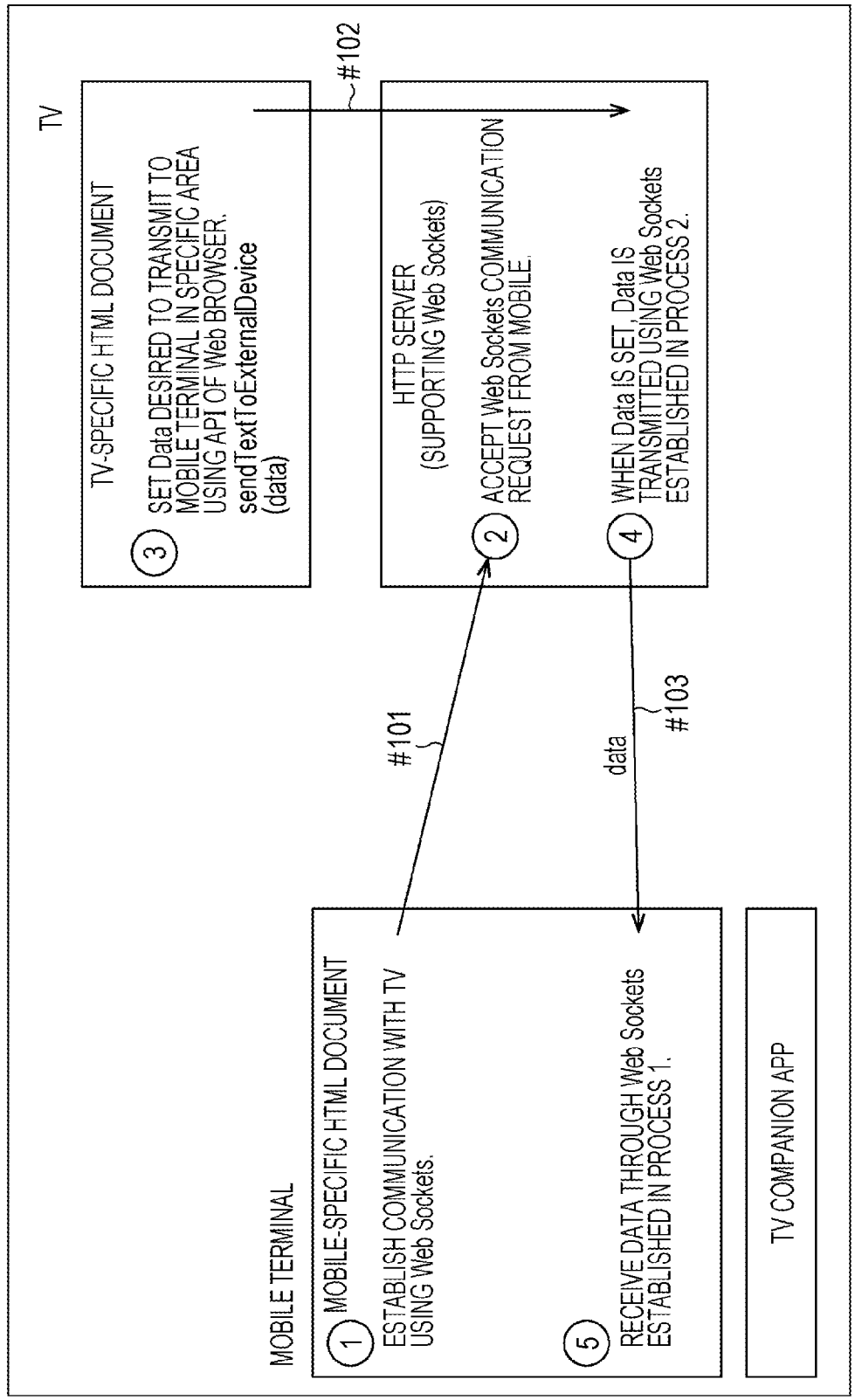
FIG. 28 is a diagram illustrating another example of the flow of communication between the HTML documents.
Figure 29:
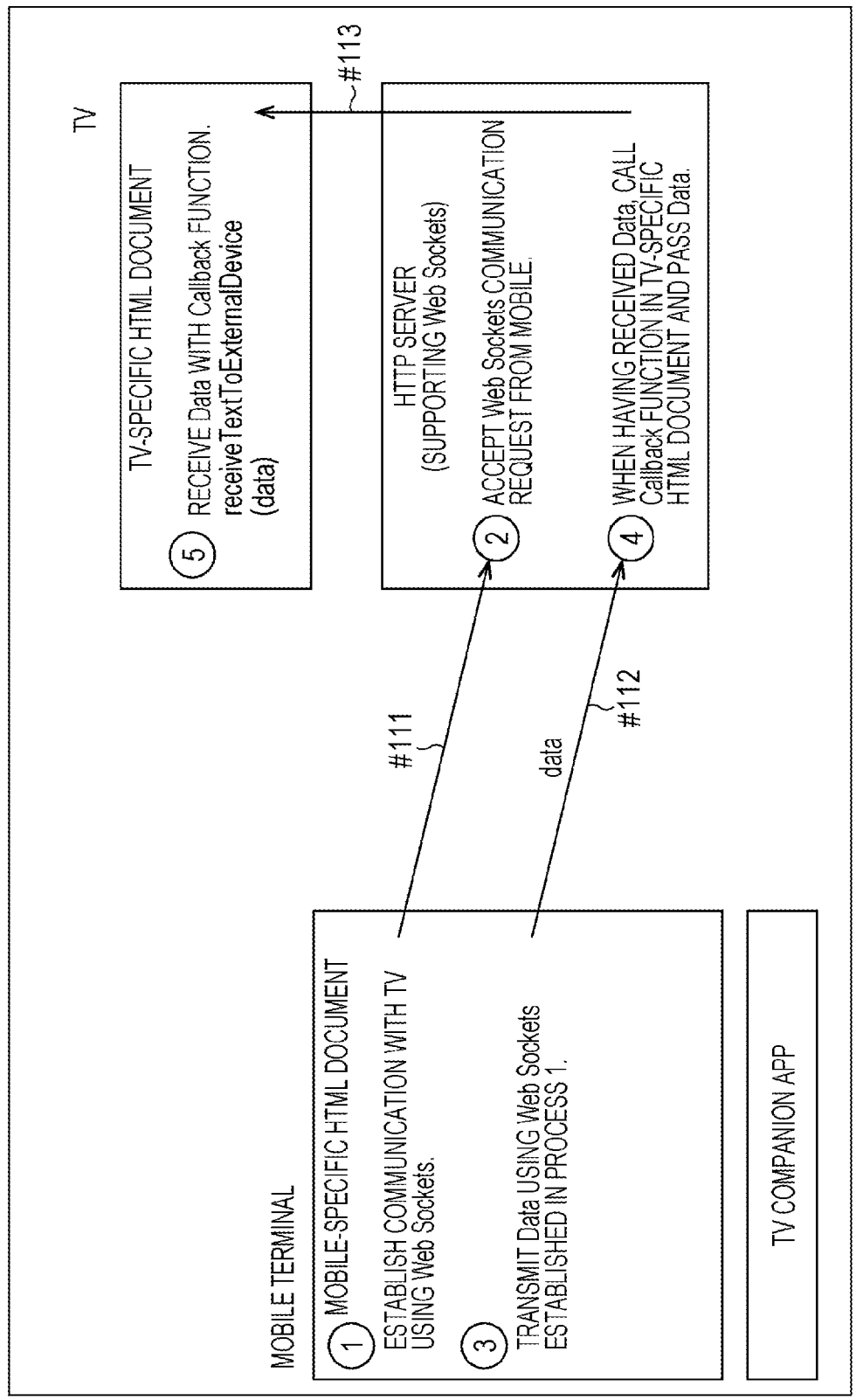
FIG. 29 is a diagram illustrating another example of the flow of communication between the HTML documents.

FIGS. 28 and 29 are diagrams illustrating the flow of communication between HTML documents when using WebSockets FIG. 28 illustrates the flow upon data transmission from the TV-specific HTML document 11 to the mobile-specific HTML document 12. FIG. 29 illustrates the flow upon data transmission from the mobile-specific HTML document 12 to the TV-specific HTML document 11.

A description is given of the flow upon data transmission from the TV-specific HTML document 11 to the mobile-specific HTML document 12, with reference to FIG. 28.

As illustrated as a process 1, the mobile-specific HTML document 12 of the mobile terminal 2 uses WebSockets to establish communication with the HTTP server 111 of the TV 1. The URL containing the IP address of the TV 1, which has been added to the URL of the mobile-specific HTML document 12 and notified by the TV 1, is used as a connection destination to establish communication using WebSockets.

As illustrated as a process 2 at the point of an arrow #101, the HTTP server 111 of the TV 1 accepts a request to establish communication using WebSockets from the mobile-specific HTML document 12, and establishes communication.

As illustrated as a process 3, the TV-specific HTML document 11 of the TV 1 sets transmission target data to the mobile terminal 2 in the specific area of the memory using the data transmission API. Having been set in the specific area, the transmission target data is provided from the TV-specific HTML document 11 to the HTTP server 111 as indicated by an arrow #102.

As illustrated as a process 4, the HTTP server 111 of the TV 1 transmits the transmission target data to the mobile-specific HTML document 12 through the communication using WebSockets, which has been established in the process 2, when the transmission target data is set in the specific area of the memory.

As illustrated as a process 5 at the point of an arrow #103, the mobile-specific HTML document 12 receives the data transmitted from the HTTP server 111 through WebSockets established in the process 1.

The flow upon data transmission from the mobile-specific HTML document 12 to the TV-specific HTML document 11 is described with reference to FIG. 29.

As illustrated as a process 1, the mobile-specific HTML document 12 of the mobile terminal 2 uses WebSockets to establish communication with the HTTP server 111 of the TV 1. The URL containing the IP address of the TV 1, which has been added to the URL of the mobile-specific HTML document 12 and notified by the TV 1, is also used here as a connection destination to establish communication using WebSockets.

As illustrated as a process 2 at the point of an arrow #111, the HTTP server 111 of the TV 1 accepts a request to establish communication using WebSockets from the mobile-specific HTML document 12, and establishes communication.

As illustrated as a process 3, the mobile-specific HTML document 12 of the mobile terminal 2 transmits data to the HTTP server 111 of the TV 1 through the communication using WebSockets, which has been established in the process 1.

As illustrated as a process 4 at the point of an arrow #112, the HTTP server 111 of the TV 1 calls the function 212 of FIG. 15 being a Callback function when receiving the data transmitted from the mobile-specific HTML document 12. Consequently, the data transmitted from the mobile-specific HTML document 12 is provided from the HTTP server 111 to the TV-specific HTML document 11 as indicated by an arrow #113.

As illustrated as a process 5, the Callback function is called and accordingly the TV-specific HTML document 11 receives the data provided from the HTTP server 111.

As described above, it can also be configured to use WebSockets for communication between HTML documents.

Figure 30:
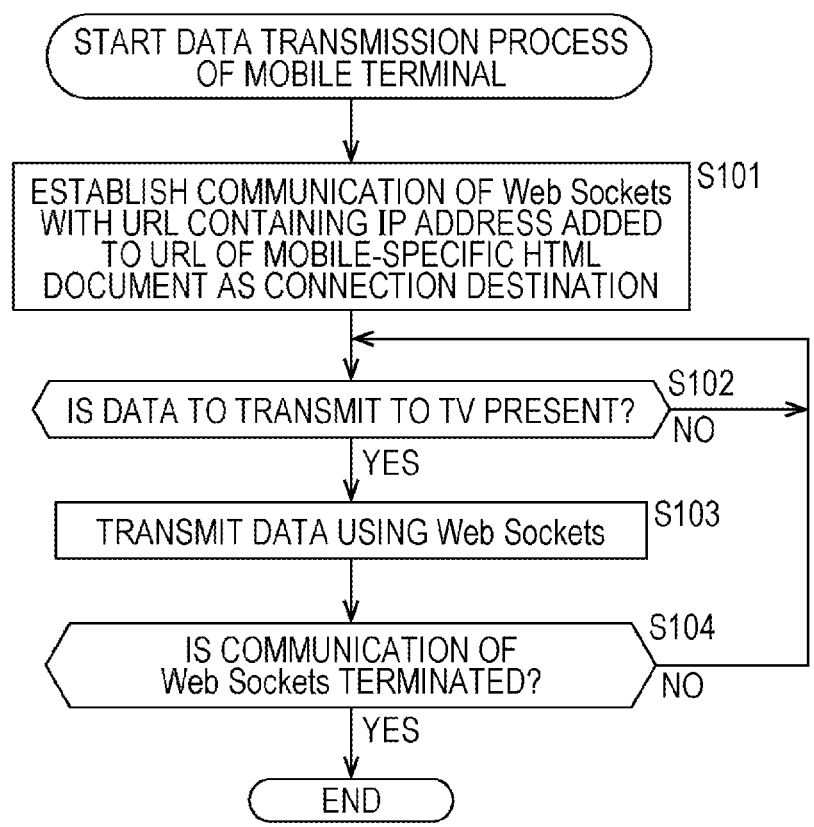
FIG. 30 is a flowchart illustrating the mobile terminal's process upon data transmission.

Here, a description is given of the mobile terminal 2's process upon data transmission using WebSockets, with reference to a flowchart of FIG. 30. The process of FIG. 30 basically corresponds to the processing on the left side of FIG. 29.

In Step S101, the mobile-specific HTML document 12 establishes communication using WebSockets with the URL containing the IP address of the TV 1 notified being added to the URL of the mobile-specific HTML document 12 as a connection destination.

In Step S102, the mobile-specific HTML document 12 determines whether or not data to transmit to the TV-specific HTML document 11 is present, and waits until it is determined that data is present.

If it is determined in Step S102 that data to transmit to the TV-specific HTML document 11 is present, the mobile-specific HTML document 12 transmits the data through the communication using WebSockets in Step S103.

In Step S104, the mobile-specific HTML document 12 determines whether or not to terminate the communication using WebSockets. If it is determined not to terminate the communication using WebSockets, return to Step S102 to repeat the above processing. If it is determined to terminate the communication using WebSockets, the process ends.

Figure 31:
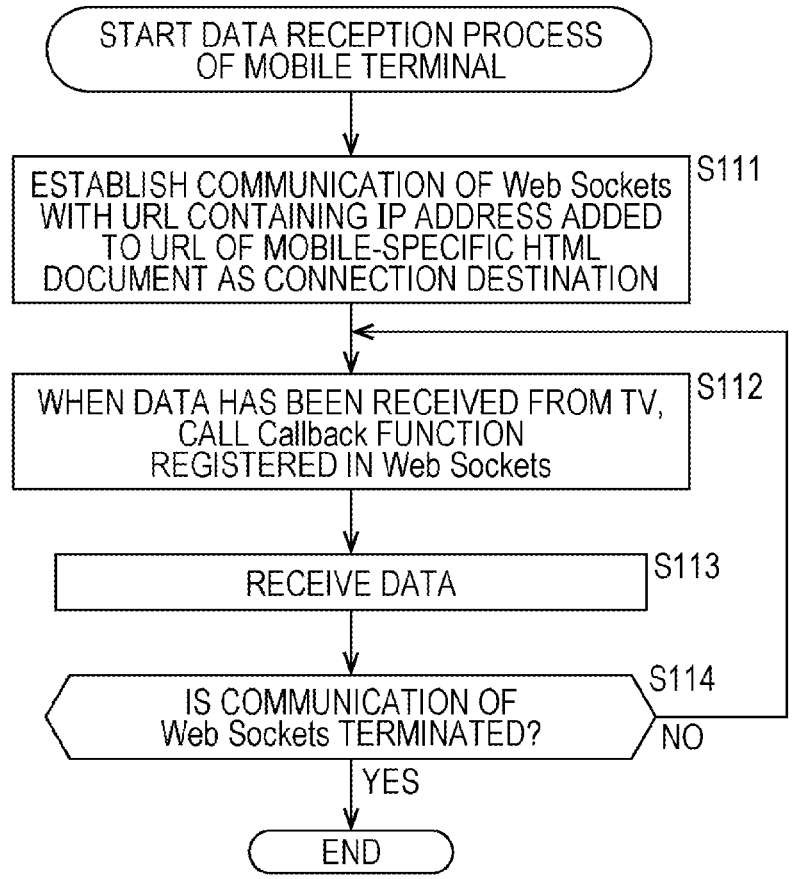
FIG. 31 is a flowchart illustrating the mobile terminal's process upon data reception.

Next, a description is given of the mobile terminal 2's process upon data reception using WebSockets, with reference to a flowchart of FIG. 31. The process of FIG. 31 basically corresponds to the processing on the left side of FIG. 28.

In Step S111, the mobile-specific HTML document 12 establishes communication using WebSockets with the URL containing the IP address of the TV 1 notified being added to the URL of the mobile-specific HTML document 12 as a connection destination.

If the data from the TV-specific HTML document 11 has been received in Step S112, a Callback function registered in WebSockets is called. In Step S113, the mobile-specific HTML document 12 receives the data from the TV-specific HTML document 11.

In Step S114, the mobile-specific HTML document 12 determines whether or not to terminate the communication using WebSockets. If it is determined not to terminate the communication using WebSockets, return to Step S112 to repeat the above processing. If it is determined to terminate the communication using WebSockets, the process ends.

The TV 1's process upon communication between HTML documents using WebSockets is basically similar to the processes described with reference to FIGS. 16 and 17.

Other Modifications

In the above description, the TV-specific HTML document 11 and the mobile-specific HTML document 12 are assumed to be managed by the same server, the Web app management server 4. However, as illustrated in FIG. 32, they may be managed by different servers, respectively.

Figure 32:
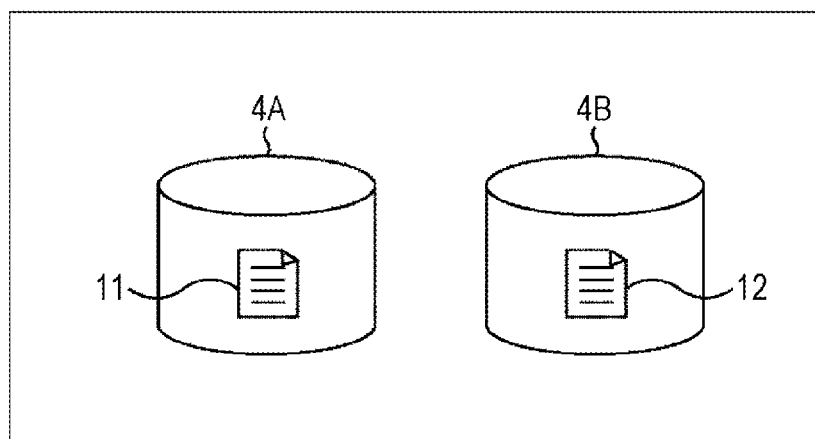
FIG. 32 is a diagram illustrating an example of the management of the HTML documents.

In the example of FIG. 32, the TV-specific HTML document 11 is managed by a Web app management server 4A. The mobile-specific HTML document 12 is managed by a Web app management server 4B. In this case, the URL of the TV-specific HTML document 11 is specified by an AIT contained in a broadcast signal. The URL of the mobile-specific HTML document 12 is specified by the TV-specific HTML document 11.

Figure 33:
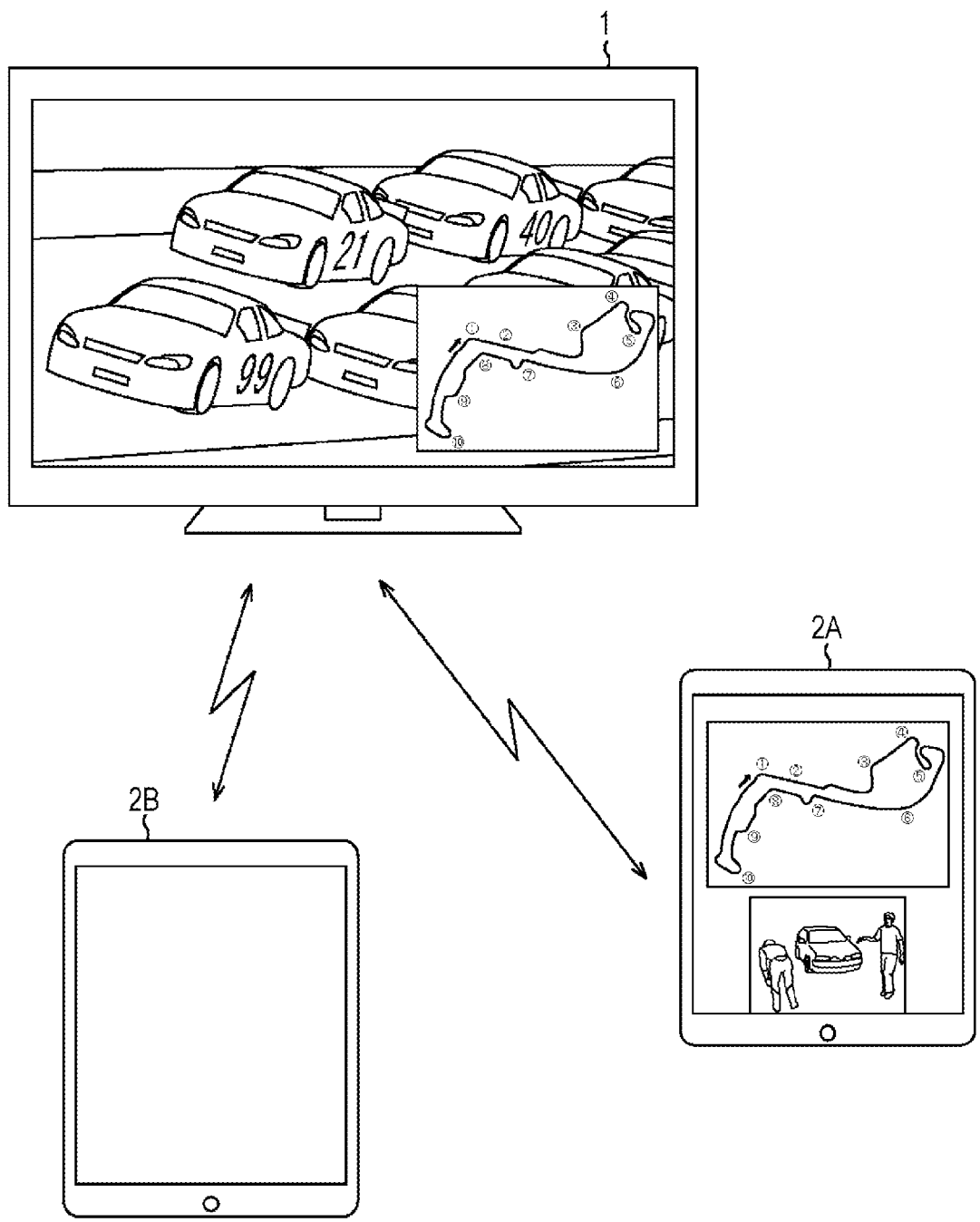
FIG. 33 is a diagram illustrating another example of TV link.

Moreover, TV link is assumed to be performed between the TV 1 and one second screen device. However, as illustrated in FIG. 33, TV link may be performed between the TV 1 and a plurality of second screen devices. In the example of FIG. 33, TV link is performed between the TV 1 and two second screen devices of a mobile terminal 2A and a mobile terminal 2B. Information displayed on the mobile terminals 2A and 2B may be synchronous or asynchronous.

Moreover, it is configured such that information related to a program (content including video and audio) broadcast from the broadcast station 3 is displayed on a second screen device. However, it may be configured such that information related to another content such as music, still images, and Web information is displayed. Therefore, it may be configured such that a tablet terminal or PC is set as the first screen, and a smartphone as the second screen, and information to be linked to web information displayed on the tablet terminal is displayed on the smartphone by use of the present technology.

Furthermore, it is configured such that a program broadcast from the broadcast station 3 is set as a content, and information related to the content is displayed using an HTML document. However, a content providing mode is not limited to the mode using a broadcast. In other words, it may be configured such that the content is provided via the Internet, or the content is provided via a recording medium such as a Blu-ray (registered trademark) Disc. Also in this case, the URL indicating the address of the TV-specific HTML document 11 is added to the content.

The above-mentioned series of processes can be executed by hardware and can also be executed by software. If the series of processes is executed by software, a program configuring the software is installed in a computer incorporated in dedicated hardware, a general-purpose personal computer, or the like.

The program to be installed is recorded and provided in the removable medium 371 illustrated in FIG. 27, which is formed of an optical disc (such as CD-ROM (Compact Disc-Read Only Memory) or DVD (Digital Versatile Disc)), or semiconductor memory. Moreover, it may be configured to be provided via a wired or wireless transmission medium such a local area network, the Internet, or digital broadcasting. The program can be installed in advance in the ROM 362 or the storage unit 368.

The program executed by the computer may be a program in which the processes are performed in chronological order along the sequence described in the description, or may be a program in which the processes are performed in parallel or at necessary timings such as when a call is issued.

Moreover, in the description, the system indicates an assembly of a plurality of components (such as apparatuses and modules (parts)) and whether or not all the components are in the same casing does not matter. Therefore, a plurality of apparatuses housed in different casings and connected via a network, and one apparatus in which a plurality of modules is housed in one casing are both the system.

An embodiment of the present technology is not limited to the above-mentioned embodiment. Various alterations can be made within the scope that does not depart from the gist of the present technology.

For example, the present technology can take a configuration of cloud computing that shares one function among a plurality of apparatuses via a network and jointly performs processing.

Moreover, the steps described in the above-mentioned flowcharts can be executed by one apparatus and can also be executed by being shared among a plurality of apparatuses.

Furthermore, if one step includes a plurality of processes, the plurality of processes included in the one step can be executed by one apparatus, and can also be executed by being shared among a plurality of apparatuses.

<Combination Example of Configurations>

The present technology can also take the following configurations:

(1)

An information processing apparatus including:

a reception control unit for allowing receiving a content containing first address information specifying a source of provision of first information being information related to the content;

an output control unit for allowing outputting the content;

an acquisition unit for acquiring the first information from a server acting as the source of the provision of the first information based on the first address information; and a provision unit for providing, to a mobile terminal, second address information included in the first information, the second address information specifying a source of provision of second information being mobile terminal-specific information related to the content.

(2)

The information processing apparatus according to the 1, wherein the first information is an HTML document including the description of a script, and the provision unit realized by executing the script provides the second address information by use of an API of a Web browser.

(3)

The information processing apparatus according to the (1) or (2), wherein the provision unit provides the second address information to which a URL containing an IP address assigned to the information processing apparatus has been added.

(4)

The information processing apparatus according to the (3), further including a communication unit for communicating with the mobile terminal after the mobile terminal acquires the second information based on the second address information.

(5)

The information processing apparatus according to the (4), wherein the first information is an HTML document including the description of a script, and the communication unit realized by executing the script transmits data to the mobile terminal and receives data transmitted from the mobile terminal with the URL containing the IP address as a transmission destination, by use of the API of the Web browser.

(6)

The information processing apparatus according to any of the (1) to (5), wherein the reception control unit allows receiving the broadcast content.

(7)

The information processing apparatus according to the (6), further including an analysis unit for analyzing an application information table included in a broadcast signal of the content, where the acquisition unit acquires the first information based on the first address information obtained by analyzing the application information table.

(8)

The information processing apparatus according to any of the (1) to (7), wherein the output control unit allows displaying a video of the content, and allows displaying information related to the content based on the first information.

(9)

The information processing apparatus according to any of the (1) to (8), wherein the first information and the second information is information prepared on a content basis by an operator who provides the content.

(10)

An information processing method including the steps of:

allowing receiving a content containing first address information specifying a source of provision of first information being information related to the content;

allowing outputting the content;

acquiring the first information from a server acting as the source of the provision based on the first address information; and providing, to a mobile terminal, second address information included in the first information, the second address information specifying a source of provision of second information being mobile terminal-specific information related to the content.

(11)

A program causing a computer to execute a process including the steps of:

allowing receiving a content containing first address information specifying a source of provision of first information being information related to the content;

allowing outputting the content;

acquiring the first information from a server acting as the source of the provision based on the first address information; and providing, to a mobile terminal, second address information included in the first information, the second address information specifying a source of provision of second information being mobile terminal-specific information related to the content.

(12)

A mobile terminal including:

an address information acquisition unit for acquiring second address information provided from an information processing apparatus that receives a content containing first address information specifying a source of provision of first information being information related to the content, outputs the content, acquires the first information from a server acting as the source of the provision of the first information based on the first address information, and provides the second address information included in the first information, the second address information specifying a source of provision of second information being mobile terminal-specific information related to the content;

a related information acquisition unit for acquiring the second information from a server acting as the source of the provision of the second information based on the second address information; and an output control unit for allowing outputting information related to the content based on the second information.

(13)

The mobile terminal according to the (12), wherein the address information acquisition unit acquires the second address information to which a URL containing an IP address assigned to the information processing apparatus has been added.

(14)

The mobile terminal according to the (13), further including a communication unit for communicating with the information processing apparatus after the second information is acquired.

(15)

The mobile terminal according to the (14), wherein the second information is an HTML document including the description of a script, and the communication unit realized by executing the script transmits transmission target data to the information processing apparatus by an HTTP request in which the transmission target data has been added, the HTTP request including the URL containing the IP address as a transmission destination, and receives data transmitted by the information processing apparatus by an HTTP request requesting the reception of the data.

(16)

An information processing method including the steps of:

acquiring second address information provided from an information processing apparatus that receives a content containing first address information specifying a source of provision of first information being information related to the content, outputs the content, acquires the first information from a server acting as the source of the provision of the first information based on the first address information, and provides the second address information included in the first information, the second address information specifying a source of provision of second information being mobile terminal-specific information related to the content;

acquiring the second information from a server acting as the source of the provision of the second information based on the second address information; and allowing outputting information related to the content based on the second information.

(17)

A program causing a computer to execute a process including the steps of:

acquiring second address information provided from an information processing apparatus that receives a content containing first address information specifying a source of provision of first information being information related to the content, outputs the content, acquires the first information from a server acting as the source of the provision of the first information based on the first address information, and provides the second address information included in the first information, the second address information specifying a source of provision of second information being mobile terminal-specific information related to the content;

acquiring the second information from a server acting as the source of the provision of the second information based on the second address information; and allowing outputting information related to the content based on the second information.

(18)

An information processing system including:

an information processing apparatus having:

a reception control unit for allowing receiving a content containing first address information specifying a source of provision of first information being information related to the content, an output control unit for allowing outputting the content, an acquisition unit for acquiring the first information from a server acting as the source of the provision of the first information based on the first address information, and a provision unit for providing, to a mobile terminal, second address information included in the first information, the second address information specifying a source of provision of second information being mobile terminal-specific information related to the content; and a mobile terminal having:
an address information acquisition unit for acquiring the second address information provided from the information processing apparatus,
a related information acquisition unit for acquiring the second information from a server acting as the source of the provision of the second information based on the second address information, and
an output control unit for allowing outputting information related to the content based on the second information.

REFERENCE SIGNS LIST

1 TV
2 Mobile terminal
3 Broadcast station
4 Web app management server
5 Native app management server
11 TV-specific HTML document
12 Mobile terminal-specific HTML document terminal
21, 22 Web browser
101 TV platform
121 Mobile platform
122 TV companion app
131 Network

The invention claimed is:

1. A content receiving device comprising:
a circuitry configured to
receive broadcast content;
acquire address information specifying a location of first content information;
acquire the first content information from the location, the first content information including a script; and
execute the script by the content receiving device including controlling display of additional content concurrently with display of the broadcast content and including sending, through wireless communication to a companion device, address information specifying a location of second content information for processing by the companion device.

2. The content receiving device according to claim 1, wherein the circuitry is configured to provide the location of the second content information including a Uniform Resource Locator (URL) containing an IP address assigned to the content receiving device.

3. The content receiving device according to claim 1, wherein the circuitry is configured to communicate with the companion device after the companion device acquires the second content information from the location of the second content information.

4. The content receiving device according to claim 3, wherein the circuitry is configured to execute a script to transmit data to the companion device and receive data transmitted from the companion device.

5. The content receiving device according to claim 1, wherein the circuitry is configured to receive application information included in the broadcast content, and determine the address information specifying the location of the first content information from the application information.

6. The content receiving device according to claim 1, wherein
the first content information is related to the broadcast content;
the circuitry is configured to acquire the first content information from a server associated with the address information specifying the location of the first content information;
the content receiving device includes a display configured to display the broadcast content together with the additional content; and
the second content information being different from the first content information and being companion device specific information related to the broadcast content.

7. The content receiving device according to claim 1, the content receiving device being a television.

8. The content receiving device according to claim 1, wherein the executing the script includes displaying the broadcast content on a same display as the additional content.

9. The content receiving device according to claim 1, wherein the sending, to the companion device, the address information specifying the location of the second content information includes causing the companion device to execute an HTML document.

10. A content receiving method comprising:
in a content receiving device comprising a circuitry,
receiving broadcast content;
acquiring address information specifying a location of first content information;
acquiring the first content information from the location, the first content information including a script; and
executing the script by the circuitry including controlling display of additional content concurrently with display of the broadcast content and including sending, through wireless communication to a companion device, address information specifying a location of the second content information for processing by the companion device.

11. The content receiving method according to claim 10, comprising providing the location of the second content information including a Uniform Resource Locator CURL) containing an IP address assigned to the content receiving device.

12. The content receiving method according to claim 10, comprising receiving application information included in the broadcast content, and determining the address information specifying the location of the first content information from the application information.

13. The content receiving method according to claim 10, wherein the executing the script includes displaying the broadcast content on a same display as the additional content.

14. The content receiving method according to claim 10, further comprising controlling display of a video of the broadcast content, and controlling display of information related to the broadcast content based on the first content information.

15. The content receiving method according to claim 10, wherein the sending, to the companion device, the address information specifying the location of the second content information includes causing the companion device to execute an HTML document.

16. A non-transitory computer-readable recording medium having a set of computer-executable instructions recorded thereon, the instructions causing a content receiving device to execute a method comprising:
receiving broadcast content;
acquiring address information specifying a location of first content information;

acquiring the first content information from the location, the first content information including a script; and executing the script by the content receiving device including controlling display of additional content concurrently with display of the broadcast content and including sending, through wireless communication to a companion device, address information specifying a location of second content information for processing by the companion device.

17. A companion device comprising:

circuitry configured to receive address information specifying a location of content information, the address information being received through wireless communication from a content receiving device executing a script that controls additional content to be displayed concurrently with broadcast content in the content receiving device;

acquire, from the location specified in the address information, the content information; and control display of the content information concurrently with the displayed broadcast content and additional content.

18. The companion device according to claim 17, wherein the circuitry is configured to communicate with the content receiving device after the companion device acquires the content information from the location corresponding to the address information.

19. The companion device according to claim 17, wherein the circuitry is configured to receive data from the content receiving device and transmit data to the content receiving device.

20. An information processing method comprising:

in a companion device, receiving address information specifying a location of content information, the address information being received through wireless communication from a content receiving device executing a script that controls additional content to be displayed concurrently with broadcast content in the content receiving device;

acquiring, from the location specified in the address information, the content information; and controlling display of the content information concurrently with the displayed broadcast content and additional content.

* * * * *